(12) United States Patent
de Jong

(10) Patent No.: US 8,410,909 B2
(45) Date of Patent: Apr. 2, 2013

(54) CABLES AND CONNECTOR ASSEMBLIES EMPLOYING A FURCATION TUBE(S) FOR RADIO-FREQUENCY IDENTIFICATION (RFID)-EQUIPPED CONNECTORS, AND RELATED SYSTEMS AND METHODS

(75) Inventor: Michael de Jong, Colleyville, TX (US)

(73) Assignee: Corning Incorporated, Corning, NY (US)

( * ) Notice: Subject to any disclaimer, the term of this patent is extended or adjusted under 35 U.S.C. 154(b) by 417 days.

(21) Appl. No.: 12/833,086

(22) Filed: Jul. 9, 2010

(65) Prior Publication Data

US 2012/0007717 A1  Jan. 12, 2012

(51) Int. Cl.
  *H04Q 5/22* (2006.01)
(52) U.S. Cl. .......................................... 340/10.4; 385/92
(58) Field of Classification Search ................. 340/10.4, 340/505; 385/92, 53, 88; 398/115, 116
See application file for complete search history.

(56) References Cited

U.S. PATENT DOCUMENTS

| | | |
|---|---|---|
| 4,367,917 A | 1/1983 | Gray |
| 4,408,828 A | 10/1983 | Le Noane et al. |
| 4,497,537 A | 2/1985 | Dench |
| 4,522,464 A | 6/1985 | Thompson et al. |
| 4,523,804 A | 6/1985 | Thompson |
| 4,545,645 A | 10/1985 | Mignien |
| 4,595,256 A | 6/1986 | Guazzo |
| 4,632,507 A | 12/1986 | Mignien et al. |
| 4,676,590 A | 6/1987 | Priaroggia |
| 4,690,497 A | 9/1987 | Occhini et al. |
| 4,722,589 A | 2/1988 | Priaroggia |
| 4,725,121 A | 2/1988 | Priaroggia |
| 4,753,500 A | 6/1988 | Guazzo |
| 4,902,097 A | 2/1990 | Worthington et al. |
| 4,952,012 A | 8/1990 | Stamnitz |
| 5,210,810 A | 5/1993 | Darden et al. |
| 5,231,688 A | 7/1993 | Zimmer |
| 5,333,230 A | 7/1994 | Hata et al. |
| 5,358,218 A | 10/1994 | Terasawa et al. |
| 5,434,944 A | 7/1995 | Kerry et al. |

(Continued)

FOREIGN PATENT DOCUMENTS

| | | |
|---|---|---|
| JP | 2007221316 A | 8/2007 |
| WO | 2007138669 A1 | 12/2007 |

OTHER PUBLICATIONS

Final Office Action for U.S. Appl. No. 12/286,183 mailed Aug. 10, 2012, 17 pages.

(Continued)

*Primary Examiner* — Vernal Brown
(74) *Attorney, Agent, or Firm* — Joseph M Homa

(57) ABSTRACT

Embodiments disclosed in the detailed description include cables and connector assemblies employing a furcation tube (s) for radio-frequency identification (RFID)-equipped connectors, and related systems and methods. In one embodiment, a connector assembly is provided that comprises a cable comprising a cable end, an interior area, at least one communication line, and at least one furcation tube disposed in the interior area. The connector assembly also comprises a connector operably connected to the cable end. At least one antenna wire is configured to be electrically connected to at least one RFID tag to serve as at least a portion of an RFID antenna for at least one RFID tag. At least a portion of the at least one antenna wire is disposed inside the furcation tube in the cable. In this manner, the antenna wire is secured inside the rugged packaging of the cable to protect the antenna wire.

25 Claims, 19 Drawing Sheets

U.S. PATENT DOCUMENTS

| | | | |
|---|---|---|---|
| 5,479,171 | A | 12/1995 | Schuermann |
| 5,495,547 | A | 2/1996 | Rafie et al. |
| 5,598,500 | A | 1/1997 | Crespel et al. |
| 5,651,081 | A | 7/1997 | Blew et al. |
| 5,787,217 | A | 7/1998 | Traut et al. |
| 5,903,693 | A | 5/1999 | Brown |
| 5,943,462 | A | 8/1999 | Schofield et al. |
| 5,966,489 | A | 10/1999 | Harwell et al. |
| 5,970,195 | A | 10/1999 | Brown |
| 6,101,304 | A | 8/2000 | Quistorff et al. |
| 6,272,273 | B1 | 8/2001 | Bookwalter et al. |
| 6,278,831 | B1 | 8/2001 | Henderson et al. |
| 6,330,385 | B1 | 12/2001 | Sheu |
| 6,389,214 | B1 | 5/2002 | Smith et al. |
| 6,438,299 | B1 | 8/2002 | Brown et al. |
| 6,647,187 | B2 | 11/2003 | Consonni et al. |
| 6,738,555 | B1 | 5/2004 | Cooke et al. |
| 6,771,861 | B2 | 8/2004 | Wagner et al. |
| 6,778,744 | B2 | 8/2004 | Norris et al. |
| 6,808,116 | B1 | 10/2004 | Eslambolchi et al. |
| 6,853,781 | B2 | 2/2005 | Chastain et al. |
| 6,876,800 | B2 | 4/2005 | Sutehall et al. |
| 6,885,798 | B2 | 4/2005 | Zimmel |
| 6,909,828 | B2 | 6/2005 | Zimmel et al. |
| 6,915,050 | B2 | 7/2005 | Koyasu et al. |
| 6,963,686 | B2 | 11/2005 | Moon |
| 6,968,106 | B2 | 11/2005 | Chastain et al. |
| 6,973,243 | B2 | 12/2005 | Koyasu et al. |
| 6,996,314 | B2 | 2/2006 | Park et al. |
| 7,027,697 | B2 | 4/2006 | Tatarka et al. |
| 7,035,510 | B2 | 4/2006 | Zimmel et al. |
| 7,046,899 | B2 | 5/2006 | Colombo et al. |
| 7,165,728 | B2 | 1/2007 | Durrant et al. |
| 7,174,076 | B2 | 2/2007 | Park et al. |
| 7,197,214 | B2 | 3/2007 | Elkins, II et al. |
| 7,202,418 | B2 | 4/2007 | Glew |
| 7,210,858 | B2 | 5/2007 | Sago et al |
| 7,241,953 | B2 | 7/2007 | Glew |
| 7,269,320 | B2 | 9/2007 | Herbst |
| 7,270,485 | B1 | 9/2007 | Robinson et al. |
| 7,280,725 | B2 | 10/2007 | Brown et al. |
| 7,302,152 | B2 | 11/2007 | Luther et al. |
| 7,313,304 | B2 | 12/2007 | Andrews et al. |
| 7,333,697 | B2 | 2/2008 | Pizzorno et al. |
| 7,336,883 | B2 | 2/2008 | Scholtz |
| 7,349,605 | B2 | 3/2008 | Noonan et al. |
| 7,409,127 | B1 | 8/2008 | Hurley et al. |
| 7,427,165 | B2 | 9/2008 | Benaron et al. |
| 7,432,447 | B2 | 10/2008 | Glew |
| 7,454,107 | B2 | 11/2008 | Miller et al. |
| 7,460,753 | B2 | 12/2008 | Kewitsch |
| 7,463,803 | B2 | 12/2008 | Cody et al. |
| 7,489,849 | B2 | 2/2009 | Reagan et al. |
| 7,494,284 | B2 | 2/2009 | Robinson et al. |
| 7,496,271 | B2 | 2/2009 | Quaderer |
| 7,512,308 | B2 | 3/2009 | Barnes et al. |
| 7,570,852 | B2 | 8/2009 | Nothofer et al. |
| 7,574,086 | B2 | 8/2009 | Oh et al. |
| 7,920,764 | B2 * | 4/2011 | Kewitsch ............ 385/101 |
| 8,172,468 | B2 * | 5/2012 | Jones et al. ............ 385/92 |
| 2001/0039320 | A1 | 11/2001 | Jacobsen et al. |
| 2002/0039869 | A1 | 4/2002 | Achille |
| 2002/0061231 | A1 | 5/2002 | Finzel et al. |
| 2002/0114595 | A1 | 8/2002 | Potash |
| 2002/0136513 | A1 | 9/2002 | Consonni et al. |
| 2003/0035635 | A1 | 2/2003 | Chastain et al. |
| 2003/0044139 | A1 | 3/2003 | Norris et al. |
| 2003/0123824 | A1 | 7/2003 | Tatarka et al. |
| 2003/0174099 | A1 | 9/2003 | Bauer et al. |
| 2003/0210875 | A1 | 11/2003 | Wagner et al. |
| 2004/0033036 | A1 | 2/2004 | Park et al. |
| 2004/0156601 | A1 | 8/2004 | Koyasu et al. |
| 2004/0174922 | A1 | 9/2004 | Yamashita et al. |
| 2004/0240810 | A1 | 12/2004 | Moon |
| 2005/0002621 | A1 | 1/2005 | Zimmel et al. |
| 2005/0031276 | A1 | 2/2005 | Zimmel et al. |
| 2005/0053341 | A1 | 3/2005 | Zimmel |
| 2005/0094953 | A1 | 5/2005 | Park et al. |
| 2005/0103518 | A1 | 5/2005 | Glew |
| 2005/0123254 | A1 | 6/2005 | Oh et al. |
| 2005/0147363 | A1 | 7/2005 | Chastain et al. |
| 2005/0185910 | A1 | 8/2005 | Zimmel |
| 2005/0199415 | A1 | 9/2005 | Glew |
| 2005/0276551 | A1 | 12/2005 | Brown et al. |
| 2006/0029340 | A1 | 2/2006 | Andrews et al. |
| 2006/0104578 | A1 | 5/2006 | Herbst |
| 2006/0132313 | A1 | 6/2006 | Moskowitz |
| 2006/0147172 | A1 | 7/2006 | Luther et al. |
| 2006/0188209 | A1 | 8/2006 | Barker et al. |
| 2007/0013487 | A1 | 1/2007 | Scholtz et al. |
| 2007/0078209 | A1 | 4/2007 | Jozokos et al. |
| 2007/0110376 | A1 | 5/2007 | Buthe et al. |
| 2007/0110384 | A1 | 5/2007 | Cody et al. |
| 2007/0140631 | A1 | 6/2007 | Pizzorno et al. |
| 2007/0151746 | A1 | 7/2007 | Glew |
| 2007/0159396 | A1 | 7/2007 | Sievenpiper et al. |
| 2007/0183726 | A1 | 8/2007 | Nothofer et al. |
| 2008/0008430 | A1 | 1/2008 | Kewitsch |
| 2008/0013884 | A1 | 1/2008 | Barker et al. |
| 2008/0013888 | A1 | 1/2008 | Barnes et al. |
| 2008/0025675 | A1 | 1/2008 | Boutoussov |
| 2008/0100456 | A1 | 5/2008 | Downie et al. |
| 2008/0100467 | A1 | 5/2008 | Downie et al. |
| 2008/0122579 | A1 | 5/2008 | German et al. |
| 2008/0138020 | A1 | 6/2008 | Robinson et al. |
| 2008/0138026 | A1 | 6/2008 | Yow et al. |
| 2008/0155985 | A1 | 7/2008 | Labrador |
| 2008/0175532 | A1 | 7/2008 | Ruckstuhl et al. |
| 2008/0247715 | A1 | 10/2008 | Oh et al. |
| 2008/0273844 | A1 | 11/2008 | Kewitsch |
| 2008/0279506 | A1 | 11/2008 | Kerry et al. |
| 2009/0034923 | A1 | 2/2009 | Miller et al. |
| 2009/0045961 | A1 | 2/2009 | Chamarti et al. |
| 2009/0060440 | A1 | 3/2009 | Wright et al. |
| 2009/0103881 | A1 | 4/2009 | Gonzales et al. |
| 2009/0190889 | A1 | 7/2009 | Robinson et al. |
| 2010/0079248 | A1 | 4/2010 | Greveling |

OTHER PUBLICATIONS

Advisory Action for U.S. Appl. No. 12/286,183 mailed Nov. 13, 2012, 5 pages.

Non-final Office Action for U.S. Appl. No. 12/286,183 mailed Mar. 13, 2012, 14 pages.

Advisory Action for U.S. Appl. No. 12/286,183 mailed Jun. 21, 2011, 3 pages.

Final Office Action for U.S. Appl. No. 12/286,183 mailed Apr. 4, 2011, 15 pages.

Non-final Office Action for U.S. Appl. No. 12/286,183 mailed Nov. 29, 2010, 11 pages.

* cited by examiner

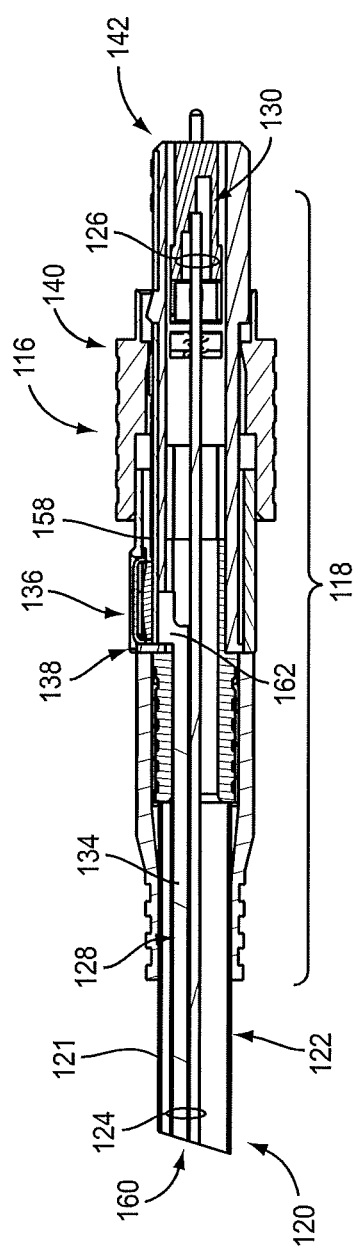
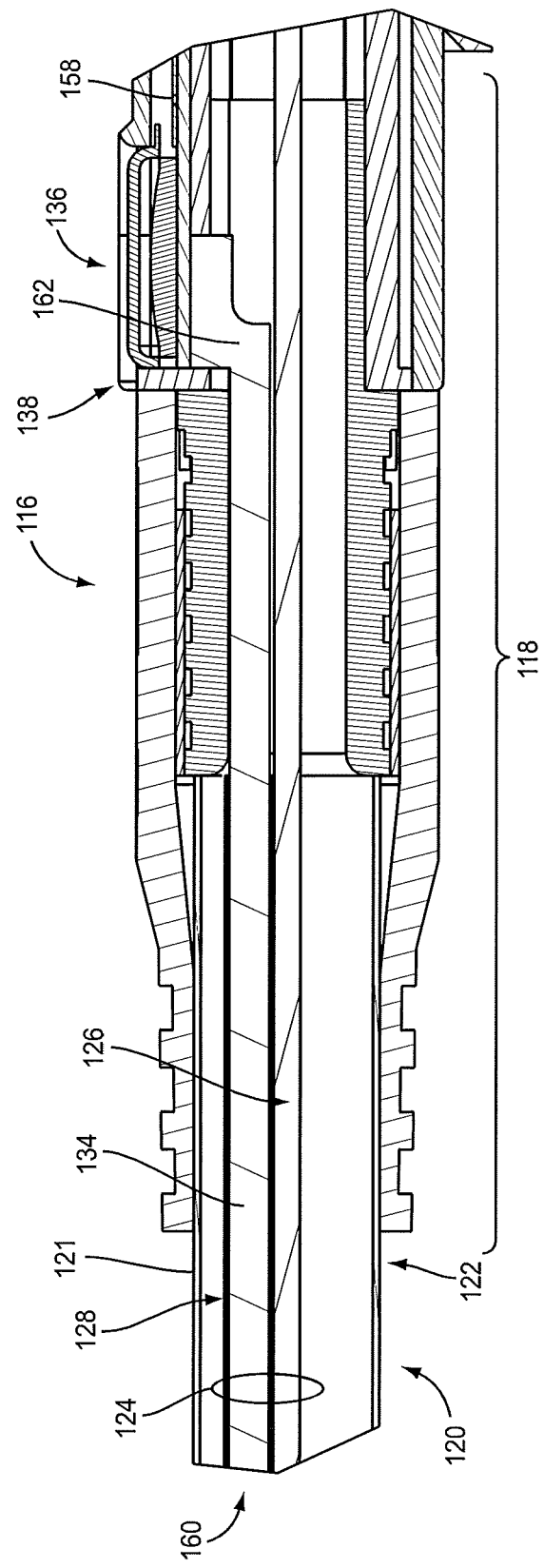
FIG. 12A
FIG. 12B

CABLES AND CONNECTOR ASSEMBLIES EMPLOYING A FURCATION TUBE(S) FOR RADIO-FREQUENCY IDENTIFICATION (RFID)-EQUIPPED CONNECTORS, AND RELATED SYSTEMS AND METHODS

RELATED APPLICATIONS

This application is related to U.S. patent application Ser. No. 12/774,898 filed on May 6, 2010 and entitled "Radio Frequency Identification (RFID) In Communication Connections, Including Fiber Optic Components," which is incorporated herein by reference in its entirety.

This application is also related to U.S. patent application Ser. No. 12/286,183 filed on Sep. 29, 2008 and entitled "Optical Fiber Connector Assembly With Wire-based RFID Antenna," which is incorporated herein by reference in its entirety.

BACKGROUND

1. Field of the Disclosure

The technology of the disclosure relates to cables for use with radio-frequency identification (RFID)-equipped components and related assemblies, including, without limitation, fiber optic cables for use with RFID-equipped fiber optic connectors and adapters.

2. Technical Background

As networking equipment and networks become more complex, the identification of proper connectors (e.g., plugs and sockets into which plugs are mated) for setting up and maintaining the systems accordingly becomes more complex. For example, typical telecommunications data centers include large numbers of optical and electrical cable connections that join various types of network equipment. Examples of network equipment include electrically-powered (active) units such as servers, switches and routers, and unpowered (passive) units such as fanout boxes and patch panels. This network equipment is often installed within cabinets in standard equipment racks. Each piece of equipment typically provides one or more adapters where optical or electrical patch cables can be physically connected to the equipment. These patch cables are generally routed to other network equipment located in the same cabinet or another cabinet.

A problem in telecommunications data center management is determining the latest configuration of all of the optical and electrical links among all of the network equipment. The configuration of optical and electrical links can be completely determined if the physical locations of all connected patch cable (or "jumper cable") connectors on installed network equipment are known. In this regard, indicia such as labels, hang tags, markings, coloration, and striping have been used to help identify specific fibers, cables, plugs, and/or sockets. Information about the physical location and connection status of the patch cables and their corresponding ports in a data center cabinet is typically manually recorded and added to a network management software database. While such indicia have been helpful in providing information to the craftsman setting up or servicing a system, large numbers of cables and connections are still complex to manage. Thus, this process is labor-intensive and prone to errors. Additionally, any changes made to the physical configuration of a cabinet must be followed up with corresponding changes to the network management software database, which delays providing the most up-to-date information about the network configuration. Furthermore, errors from manual recording and entering configuration data tend to accumulate over time, reducing the trustworthiness of the network management software database.

In response, radio-frequency identification (RFID) systems have been applied to provide information regarding connectors and related components. RFID systems can automatically and remotely identify individual connections (i.e., connector-port connections). For example, RFID may be employed in optical fiber connectors and adapters employed to establish connections to optical fibers disposed in fiber optic cables. RFID can also be employed for electrical connectors. These RFID systems can employ RFID transponders comprising an antenna and an RFID integrated circuit (IC) chip attached to or otherwise disposed in a connector for use in identification. The RFID IC chip stores information for radio-frequency (RF) communication. An RFID reader comprising a transceiver sends an RF signal to interrogate information from the RFID transponders. The RFID reader can determine stored information about the connector and the cables connected to the connector from the RFID transponders. Current commercially available automated solutions utilize an overlay of copper wiring, which adds cost and complexity to the cabinet while providing only a limited ability to perform connector-port identifications.

While RFID systems have been employed in telecommunication systems to identify system components, one of the difficulties presented is the density and number of the connections involved, which leaves little room for RFID tags. For example, a typical present-day 4 U (i.e., 1 U equals standard 1.75 inches in height) data center cabinet may contain up to one hundred forty-four (144) ports. If each of these ports has at least one RFID tag, then the RFID tags need to be very compact. Such dense arrangements of RFID tags leave very little room for RFID tag antennas that can adequately and efficiently harvest energy from the RFID interrogation signals from the RF reader and ensure that all of the tags in the relatively small volume can communicate the connector-port information to the RF reader. In some cases, standard RFID tag antennas that might work for one RFID application do not work as well for other applications, such as telecommunication cabinets and like telecommunication assemblies, where the density of RFID tags can interfere with RF communication between the RFID tags and the RF reader.

SUMMARY OF THE DETAILED DESCRIPTION

Embodiments disclosed in the detailed description include cables and connector assemblies employing a furcation tube (s) for radio-frequency identification (RFID)-equipped connectors, and related systems and methods. The cables, connector assemblies, and related systems and methods provide for an antenna wire that either forms all or a portion of an antenna for an RFID transponder or tag. The RFID tag may be provided as part of the connector assembly. If the length of the antenna wire extends beyond or outside of the connector housing, embodiments disclosed herein provide for the antenna wire to be packaged inside at least one furcation tube disposed in a cable carrying a communication line(s) and forming part of the connector assembly. In this manner, the antenna wire is secured inside the cable of the cable assembly. The cable assembly provides a rugged assembly internal to the cable to protect the antenna wire from breakage. For example, bend relief provided as part of the cable or assembly to protect the communication line(s) can also protect the antenna wire. Packaging the antenna wire inside the cable may also avoid snagging of the antenna wire.

In this regard, in one embodiment, a connector assembly is provided. The connector assembly comprises a cable comprising a cable end, an interior area, at least one communication line, and at least one furcation tube disposed in the interior area of the cable. The connector assembly also comprises a connector operably connected to the cable end. The connector assembly also comprises at least one antenna wire configured to be electrically connected to at least one radio-frequency identification (RFID) tag to serve as at least a portion of an RFID antenna for the at least one RFID tag. At least a portion of the at least one antenna wire is disposed inside the at least one furcation tube in the cable to be supported in the interior area of the cable.

In another embodiment, a telecommunications assembly is provided. The telecommunications assembly comprises a plurality of connector assemblies. The plurality of connector assemblies each comprise a cable comprising a cable end, an interior area, at least one communication line, and at least one furcation tube disposed in the interior area, and a connector operably connected to the cable end. The plurality of connector assemblies also each include at least one antenna wire configured to be electrically connected to at least one radio-frequency identification (RFID) tag to serve as at least a portion of an RFID antenna for the at least one RFID tag. At least a portion of the at least one antenna wire is disposed inside the at least one furcation tube of a cable. The telecommunications assembly also comprises a plurality of adapters. The plurality of adapters have respective RFID tags. The plurality of adapters are operably engaged with the plurality of connector assemblies so that their RFID tags are respectively electrically connected to respective antenna wires of the corresponding connector assemblies. Further, the telecommunications assembly comprise at least one RFID reader arranged in relation to the antenna wires so as to operably communicate with the plurality of RFID tags via the respective antenna wires.

In another embodiment, a method of providing a connector assembly is provided. The method includes providing a connectorized cable comprising a cable end, an interior area, at least one communication line, at least one furcation tube disposed in the interior area, and a connector operably connected to the cable end. The method also includes disposing at least a portion of at least one antenna wire run from the connector inside the at least one furcation tube. The method also includes electrically connecting the at least one antenna wire to an integrated circuit (IC) chip of at least one radio-frequency identification (RFID) tag so as to serve as at least a portion of an RFID antenna for the at least one RFID tag.

The cables disclosed herein may be any type of cable, including but not limited to a fiber optic cable, and electrical or magnetic communication cable, a power cable, etc. The communications lines provided in the cables may include, but are not limited to, optical fibers, copper lines, other electrically or magnetically conductive lines. The connectors and adapters disclosed herein may also be of any connector and adapter type, including but not limited to fiber optic connectors and adapters, electrical communication connectors and adapters, and magnetic communication connectors and adapters. Any type of connectors and/or adapters may be included in the assemblies disclosed herein.

The RFID transponders or tags disclosed herein may include active operation, semi-passive operation, or passive operation. Active RFID tags include a transmitter and thus also include a power source to power the transmitter. Semi-passive RFID tags include a power source, but do not include a transmitter. The power source provides power for an integrated circuit (IC) in the RFID tag to process received RF signals and reflect or backscatter the received RF signals over an antenna to an RFID reader. Passive RFID tags also receive RF signals and provide communications to RFID readers by reflecting or backscattering the received RF signals over an antenna. However, passive RFID tags do not include their own power source. Rather, passive RFID tags harvest energy from received RF signals to provide power. The connector assemblies disclosed herein may be particularly suitable for passive RFID tags, because antenna wires for passive RFID tags may be required to be longer in length to increase the ability of the RFID tag to harvest power from RF signals. Thus, the longer length antenna wires for passive RFID tags employed in connector assemblies may extend outside connector housings and thus benefit from being at least partially disposed in a cable provided as part of the cable assembly.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIGS. 12A and 12B are perspective cross-section views of the RFID-equipped MTP fiber optic connector assembly of FIG. 11;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include cables and connector assemblies employing a furcation tube (s) for radio-frequency identification (RFID)-equipped connectors, and related systems and methods. The cables, connector assemblies, and related systems and methods provide for an antenna wire that either forms all or a portion of an antenna for an RFID transponder or tag. The RFID tag may be provided as part of the connector assembly. If the length of the antenna wire extends beyond or outside of the connector housing, embodiments disclosed herein provide for the antenna wire to be packaged inside at least one furcation tube disposed in a cable carrying a communication line(s) and forming part of the connector assembly. In this manner, the antenna wire is secured inside the cable of the cable assembly. The cable assembly provides a rugged assembly internal to the cable to protect the antenna wire from breakage. For example, bend relief provided as part of the cable or assembly to protect the communication line(s) can also protect the antenna wire. Packaging the antenna wire inside the cable may also avoid snagging of the antenna wire.

For example, in one embodiment, a connector assembly is provided. The connector assembly comprises a cable comprising a cable end, an interior area, at least one communication line, and at least one furcation tube disposed in the interior area of the cable. The connector assembly also comprises a connector operably connected to the cable end. The connector assembly also comprises at least one antenna wire configured to be electrically connected to at least one RFID tag to serve as at least a portion of an RFID antenna for the at least one RFID tag. At least a portion of the at least one antenna wire is disposed inside the at least one furcation tube in the cable to be supported in the interior area of the cable.

Figure 1A:
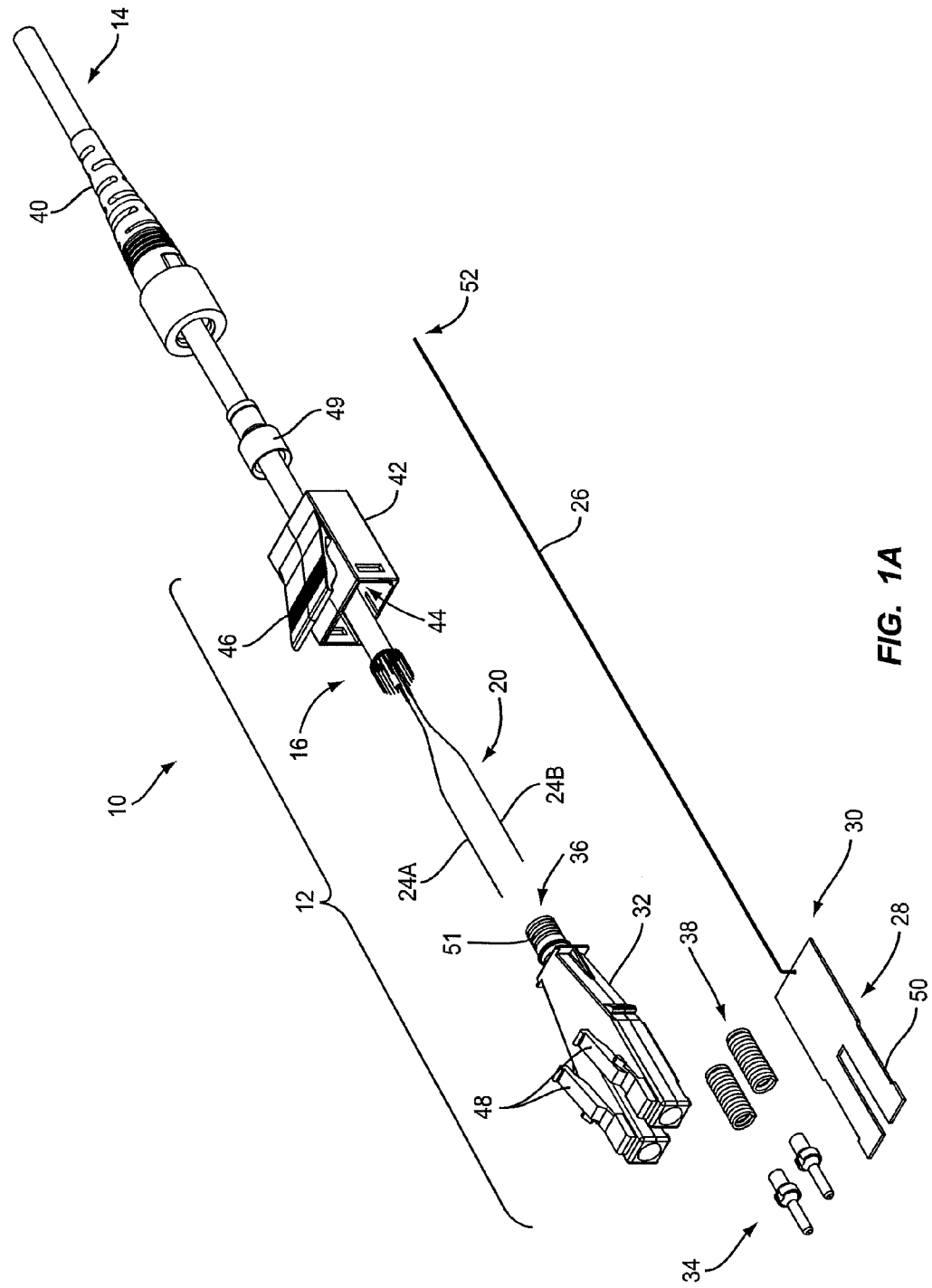
FIGS. 1A and 1B are top and bottom, perspective, exploded views, respectively, of an exemplary radio-frequency identification (RFID)-equipped connector assembly including a duplex LC fiber optic connector and duplex fiber optic cable having a furcation tube configured to receive an antenna wire of the duplex LC fiber optic connector.
Figure 1B:
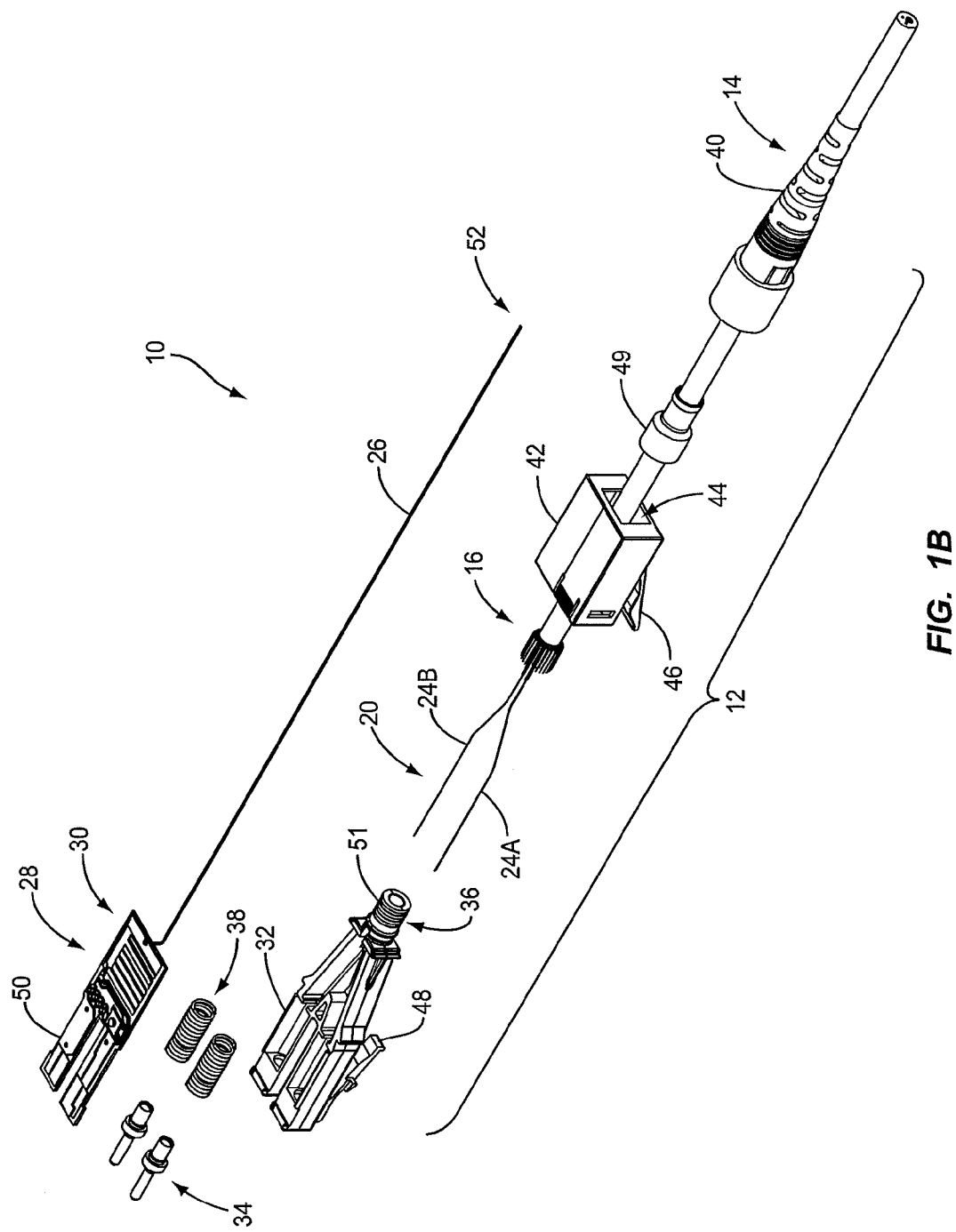
Figures 2A, 2B:
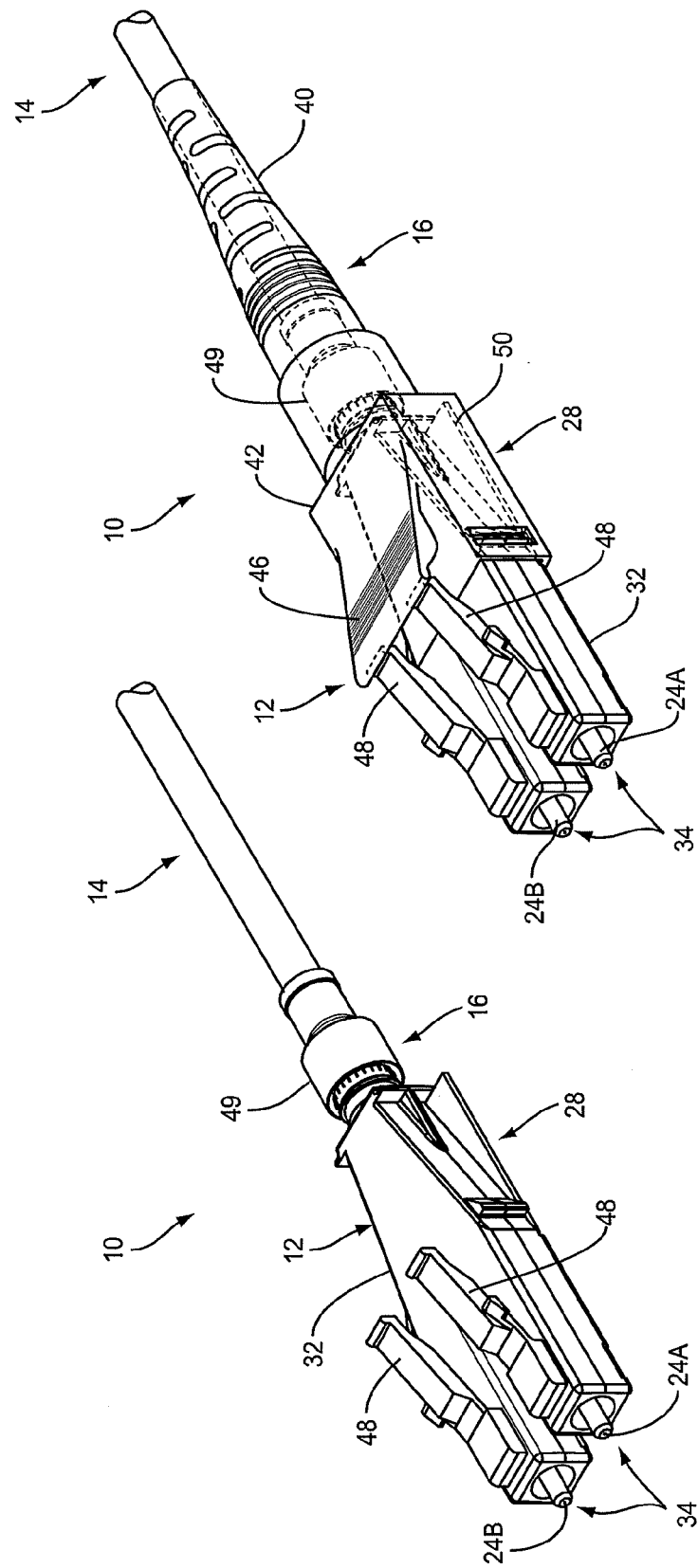
FIGS. 2A and 2B are front, perspective views of the connector assembly of FIG. 1 assembled without and with a trigger housing provided for the duplex LC fiber optic connector, respectively.

In this regard, FIGS. 1A and 1B illustrate top and bottom perspective, exploded views, respectively, of one example of a connector assembly. The connector assembly is provided in the form of a fiber optic connector assembly 10. In this embodiment as will be discussed in more detail below, the fiber optic connector assembly 10 is RFID-equipped. In this example, the fiber optic connector assembly 10 includes a duplex LC fiber optic connector 12 and a fiber optic cable 14. The duplex LC fiber optic connector 12 is RFID-equipped, as discussed in more detail below. The fiber optic cable 14 comprises a cable end 16. The duplex LC fiber optic connector 12 is operably connected to the cable end 16, as illustrated in FIGS. 2A and 2B. FIGS. 2A and 2B illustrate the fiber optic connector assembly 10 in FIGS. 1A and 1B fully assembled.

Figure 3A:
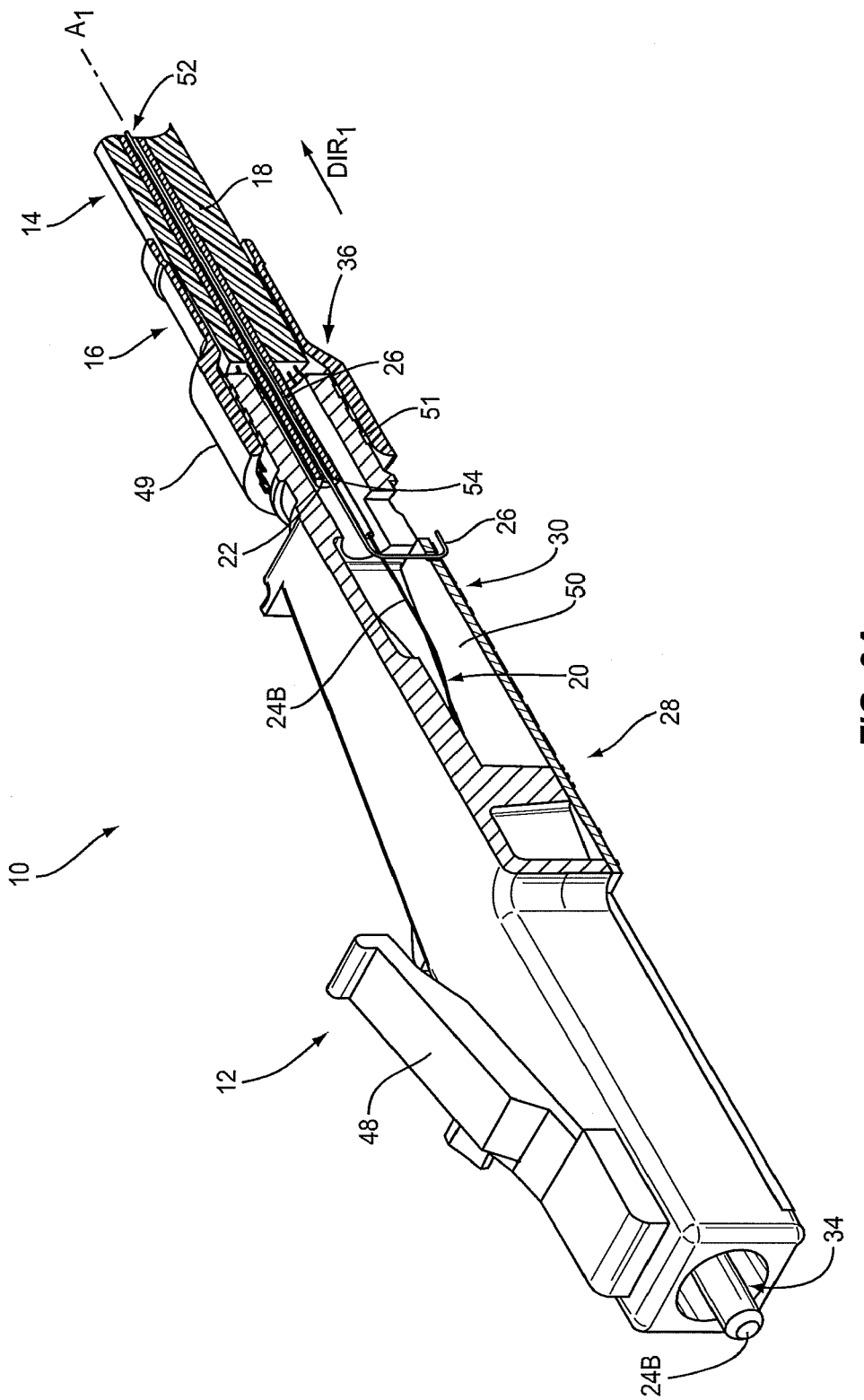
FIGS. 3A and 3B are perspective cross-section views of the RFID-equipped connector assembly of FIG. 1.
Figure 3B:
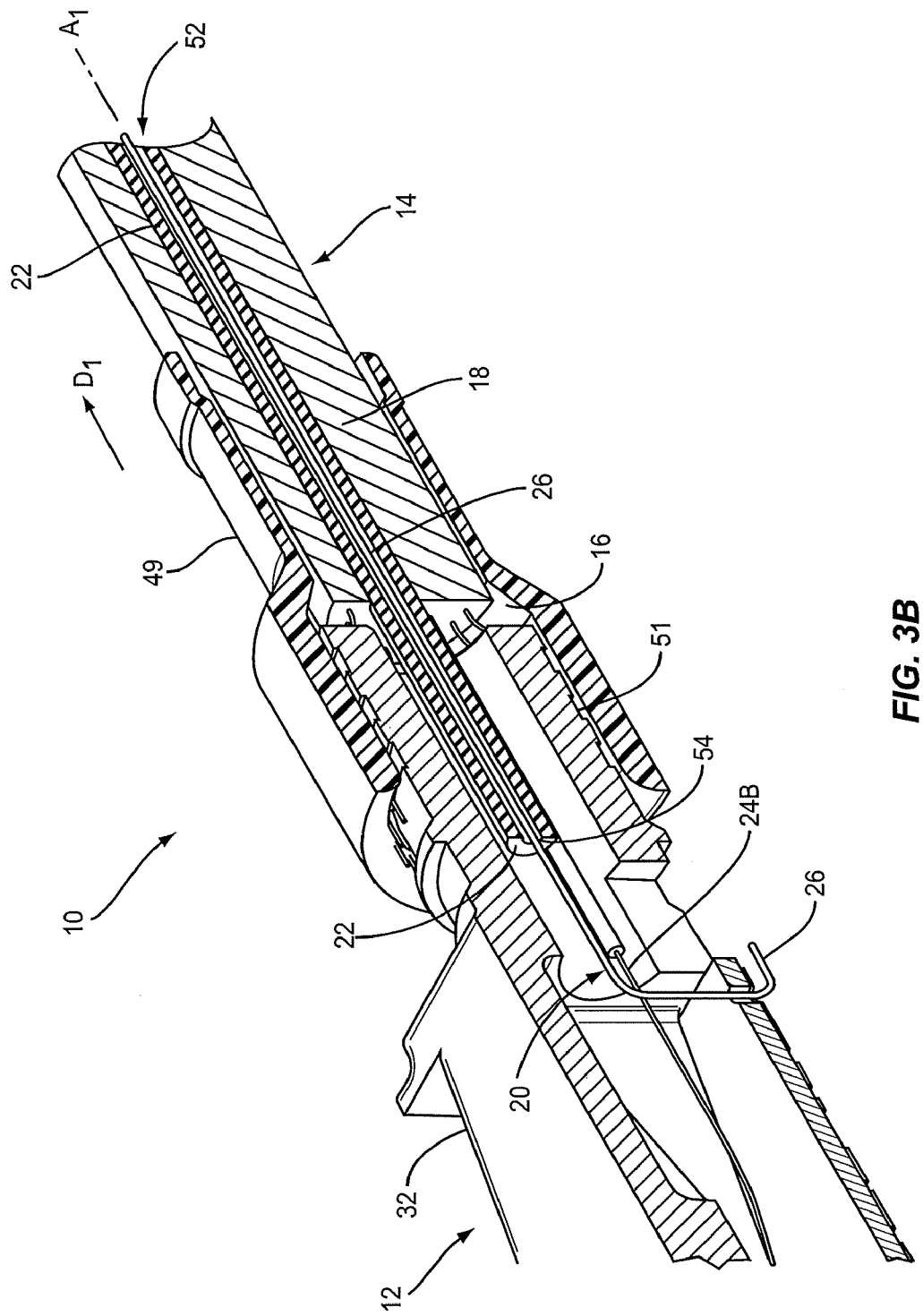

As illustrated in FIGS. 3A and 3B described in more detail below, the fiber optic cable 14 contains an interior area 18. At least one communication line 20 and at least one furcation tube 22 are disposed in the interior area 18 of the fiber optic cable 14. For example, as illustrated in FIG. 1A, the communication line 20 is comprised of two optical fibers 24A, 24B forming a duplex pair of optical fibers. The fiber optic connector assembly 10 is configured such that the furcation tube 22 (FIGS. 3A and 3B) can receive at least a portion of an antenna wire 26. The antenna wire 26 is configured to be electrically connected to an RFID transponder or tag 28 (referred to as "RFID tag 28") disposed in the duplex LC fiber optic connector 12. The antenna wire 26 serves at least a portion of an RFID antenna 30 for the RFID tag 28 disposed in the duplex LC fiber optic connector 12. For example, the antenna wire 26 may form a dipole or monopole antennas as examples, but can form any type of antenna.

With continuing reference to FIGS. 1A and 1B, and FIGS. 2A and 2B, the duplex LC fiber optic connector 12 contains a housing 32 configured to hold ferrules 34 receiving the optical fibers 24A, 24B. The optical fibers 24A, 24B are exposed from the cable end 16 and inserted through an inlet opening 36 in the housing 32 to be routed to and disposed through the ferrules 34. Springs 38 are disposed in cavities located inside the housing 32 to spring-load the ferrules 34. The cable end 16 is placed through a boot 40 that provides bend relief for the optical fibers 24A, 24B. A trigger housing 42 is connected to the housing 32 and configured to receive the cable end 16 extending through the boot 40 through a trigger housing passage 44. The trigger housing 42 contains a trigger or latch 46 configured to engage duplex LC connector latches 48 on the housing 32 to release the housing 32 from a fiber optic adapter when connected thereto. To secure the cable end 16 to the housing 32, a crimp band 49 is provided to secure the cable end 16 to a crimp boss 51. The housing 32 of the duplex LC fiber optic connector 12 is RFID-equipped in this embodiment by being configured to receive a printed circuit board (PCB) 50 that contains traces, electronic devices, and/or antenna components configured to be electrically connected to the antenna wire 26 to provide the RFID tag 28 in the duplex LC fiber optic connector 12.

FIGS. 3A and 3B are perspective cross-section views of the fiber optic connector assembly 10 of FIGS. 1A and 1B to provide more detail regarding disposition of the antenna wire 26 in the furcation tube 22 disposed in the fiber optic cable 14. FIG. 3B is a close-up view of cross-section view of the fiber optic connector assembly 10 illustrated in FIG. 3A. In this regard, the antenna wire 26 is connected to the PCB 50 to form at least a part of the RFID antenna 30 for the RFID tag 28. In this embodiment, the antenna wire 26 is bent approximately ninety (90) degrees to be oriented along a longitudinal axis $A_1$ of the furcation tube 22. The antenna wire 26 is provided as a pigtail. The antenna wire 26 may be of any length. As an example, the antenna wire 26 may be one hundred (100) millimeters (mm) in length. As another example, the antenna wire 26 may have an exposed section with any length desired, such as between 7.0 centimeters (cm) and 11.0 cm, as a non-limiting example.

Before the cable end 16 is secured to the crimp boss 51 of the housing 32, an end 52 of the antenna wire 26, as illustrated in FIGS. 1A, 1B, 3A, and 3B, is inserted into an inlet opening 54 of the furcation tube 22. As the cable end 16 is moved forward towards the inlet opening 36, the antenna wire 26 moves in a direction $DIR_1$ inside the furcation tube 22 until the cable end 16 is secured to the inlet opening 36. In this manner, the antenna wire 26 is protected inside the furcation tube 22 to prevent breakage. Because the furcation tube 22 is disposed inside the fiber optic cable 14, the bend relief provided by the fiber optic cable 14 and the boot 40 (FIGS. 1A and 1B) also serves to provide bend relief for the antenna wire 26 when the cable end 16 is bent. As an example, any whole or portion of the length of the antenna wire 26 may be disposed inside the furcation tube 22. As a non-limiting example, at least seventy-five percent (75%) of the length the antenna wire 26 may be disposed inside the furcation tube 22. In this embodiment, the furcation tube 22 extends past the cable end 16 and at least partially into the inlet opening 36 of the housing 32 to protect the antenna wire 26 from bending or kinking at the transition point between the housing 32 and the cable end 16.

The furcation tube 22 is any tube or enclosure configured to receive an antenna wire. The furcation tube 22 may be of any size outer and inner diameter desired. The furcation tube 22 may be constructed out of any material desired. For example, the furcation tube 22 may be constructed out of a polymer, such as a polyvinylidene fluoride (PVDF), as an example. It may be desired to construct the furcation tube 22 out of a material that provides low friction between the antenna wire 26 and the furcation tube 22 to facilitate easy insertion of the antenna wire 26 into the furcation tube 22 and to avoid kinking and damaging the antenna wire 26 during insertion.

Figure 4:
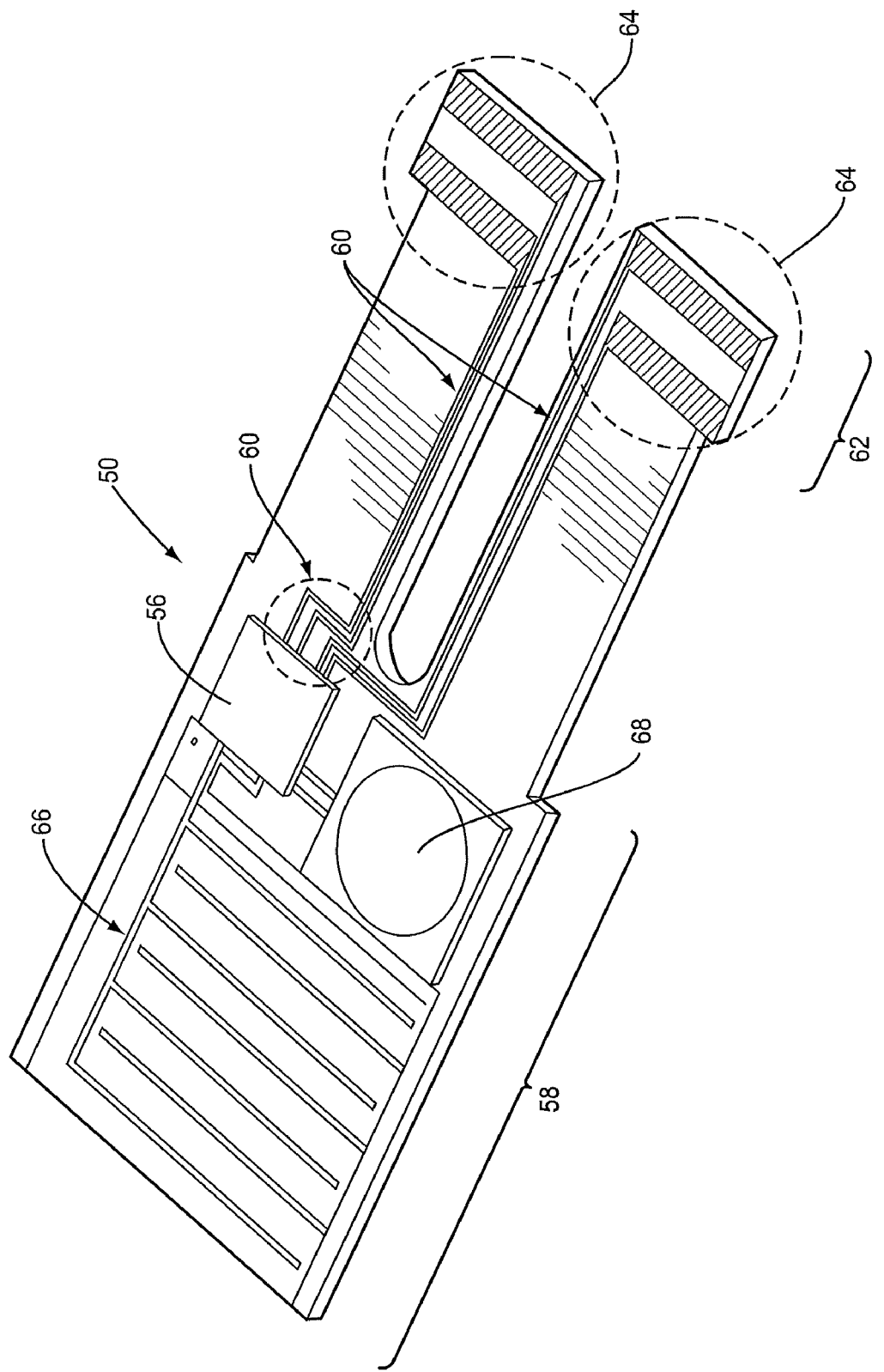
FIG. 4 is a schematic diagram of an exemplary printed circuit board (PCB) configured to be disposed in the duplex LC fiber optic connector in FIG. 1 to provide an integrated RFID circuit and RFID-equipped duplex LC fiber optic connector.
Figure 8:
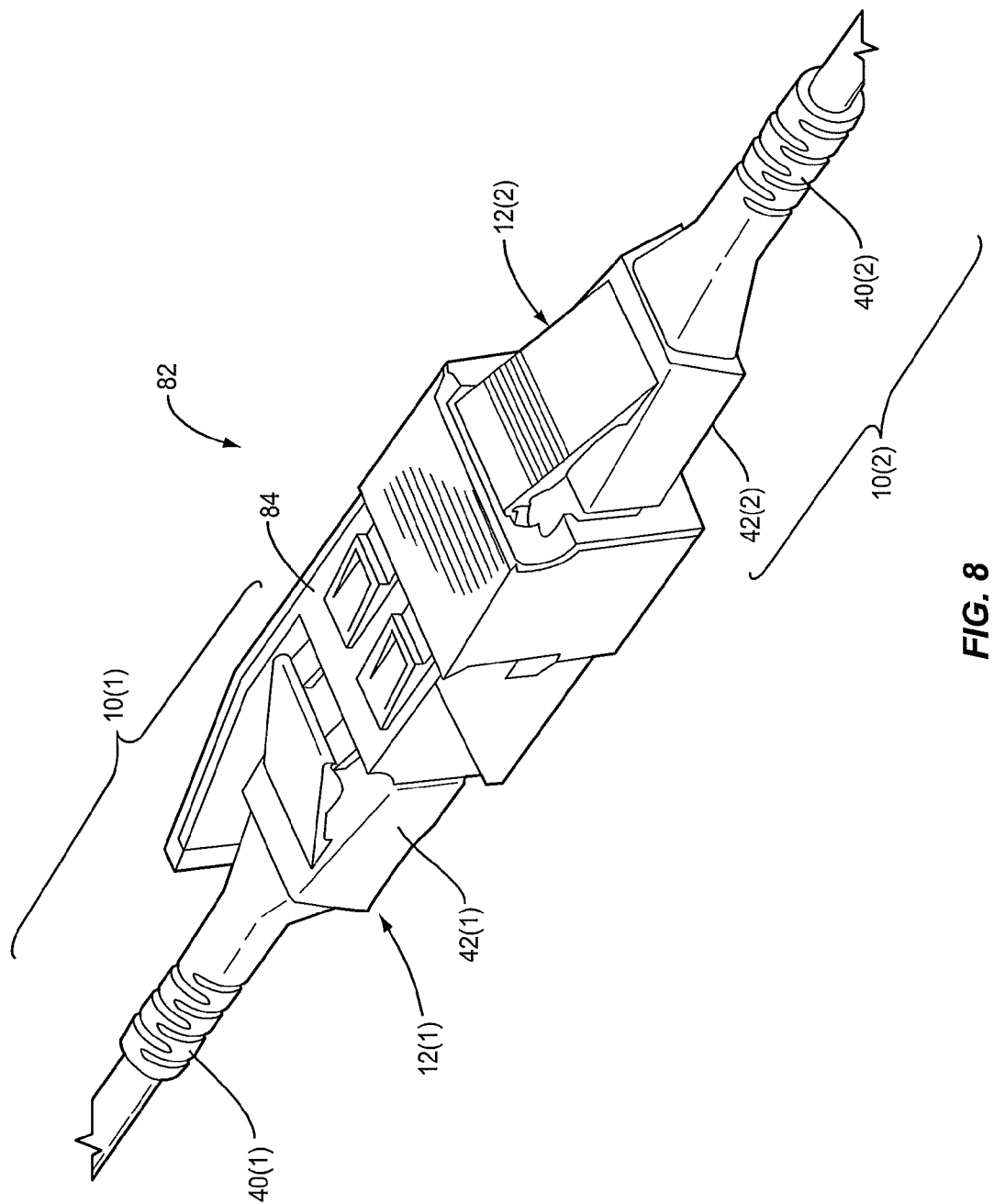
FIG. 8 is a top, perspective exploded view of two (2) RFID-equipped duplex LC fiber optic connector assemblies of FIG. 1 connected through an intermediary RFID-equipped duplex fiber optic adapter.

FIG. 4 illustrates the PCB 50 disposed in the duplex LC fiber optic connector 12 in FIGS. 1A-3B in more detail. The PCB 50 establishes the circuit for the RFID tag 28 disposed in the housing 32 of the duplex LC fiber optic connector 12. The PCB 50 contains an RFID integrated circuit (IC) chip 56 in a rear portion 58 of the PCB 50. Traces 60 provided in a front portion 62 of the PCB 50 connect pins of the RFID IC chip 56 to electrical contacts 64 contained on the PCB 50. These electrical contacts 64 are configured to establish electrical connections to the RFID IC chip 56 when the duplex LC fiber optic connector 12 is connected to a compatible duplex LC fiber optic adapter 84, as illustrated in FIG. 8 and described in more detail below. The RFID IC chip 56 is also coupled to an antenna matrix 66 provided in the PCB 50, which is coupled to the antenna wire 26 extending out from the PCB 50. The antenna matrix 66 provides a wire loop antenna integrated into the PCB 50 to provide radio-frequency (RF) signal frequency tuning for signals received on the antenna wire 26. An activation button 68 can also be provided to enable the RFID IC chip 56 so that the RFID IC chip 56 can provide information to an RFID reader, such as identification information for example.

The RFID tag 28 provided in the fiber optic connector assembly 10 may include active operation, semi-passive operation, or passive operation. Active RFID tags include a transmitter and thus also include a power source to power the transmitter. Semi-passive RFID tags include a power source, but do not include a transmitter. The power source provides power for an integrated circuit (IC) in the RFID tag to process received RF signals and reflect or backscatter the received RF signals over an antenna to an RFID reader. Passive RFID tags also receive RF signals and provide communications to RFID readers by reflecting or backscattering the received RF signals over an antenna. However, passive RFID tags do not include their own power source. Rather, passive RFID tags harvest energy from received RF signals to provide power. The connector assemblies disclosed herein may be particularly suitable for passive RFID tags, because antenna wires for passive RFID tags may be required to be longer in length to increase the ability of the RFID tag to harvest power from RF signals. Thus, the longer length antenna wires for passive RFID tags employed in connector assemblies may extend outside connector housings and thus benefit from being at least partially disposed in a cable provided as part of the cable assembly.

The fiber optic cable 14 arrangement and furcation tube 22 disposed therein in FIGS. 1A-3B can take any form or configuration desired. For example, FIGS. 5-7 discussed below provide three (3) examples of duplex fiber optic cables 14(1)-14(3), respectively, that each includes a furcation tube 22(1)-22(3) to receive at least a portion of an antenna wire. The duplex fiber optic cables 14(1)-14(3) in FIGS. 5-7 may be employed in the fiber optic connector assembly 10 in FIGS. 1A-3B.

Figure 5:
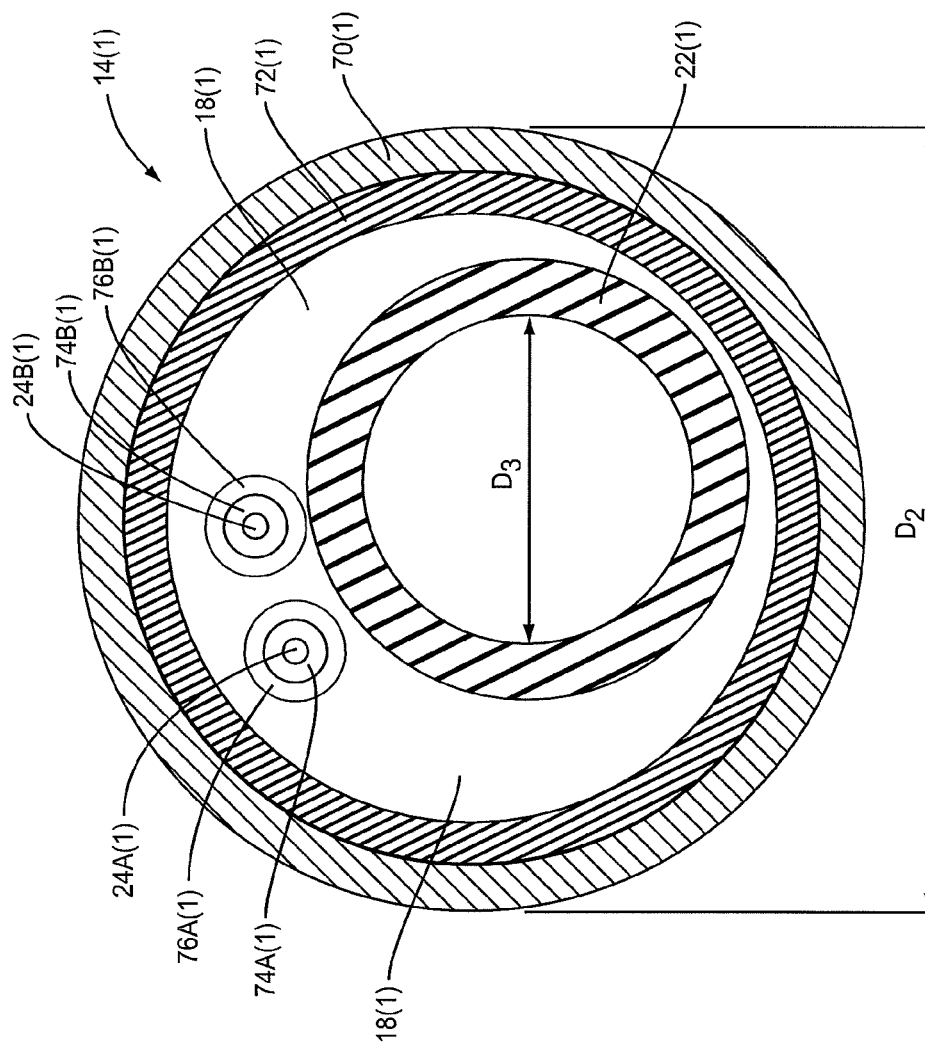
FIG. 5 is a front view of an exemplary duplex fiber optic cable configured to receive at least a portion of an antenna wire of an RFID-equipped connector.

FIG. 5 is a front view of a first exemplary duplex fiber optic cable 14(1) configured to receive at least a portion of an antenna wire of an RFID-equipped connector. The antenna wire may be the antenna wire 26 in the fiber optic connector assembly 10 in FIGS. 1A-3B. Likewise, the RFID-equipped connector may be the duplex LC fiber optic connector 12 in FIGS. 1A-3B. With reference to FIG. 5, the duplex fiber optic cable 14(1) is provided. The duplex fiber optic cable 14(1) is comprised of an outer jacket 70(1) surrounding a strength member 72(1). For example, an outer diameter $D_2$ of the outer jacket 70(1) may be 3.3 millimeters (mm) or 2.0 mm, as examples. The strength member 72(1) may be comprised, for example, of a Kevlar® or other aramid material, such as yarn, or any other material desired. Two optical fibers 24A(1), 24B(1) are disposed in an interior area 18(1) formed by the outer jacket 70(1) and strength member 72(1) to provide duplex communications capability.

In this embodiment, the two optical fibers 24A(1), 24B(1) are constructed of a core surrounded by a cladding 74A(1), 74B(1). A coating material 76A(1), 76B(1) is disposed around the cladding 74A(1), 74B(1) in this embodiment. For example, the coating material 76A(1), 76B(1) may be any material desired, such as an acrylate for example. In this example, the outer diameter of the optical fibers 24A(1), 24B(1) is one hundred twenty-five (125) micrometers (μm), and two hundred fifty (250) μm with the coating material 76A(1), 76B(1), but each can be of any diameter. The cladding 74A(1), 74B(1) and/or coating material 76A(1), 76B(1) could also be surrounded by a buffer material to be tightly buffered, if desired.

With continuing reference to FIG. 5, a furcation tube 22(1) is also disposed in the interior area 18(1). The furcation tube 22(1) is configured to receive at least a portion of an antenna wire. For example, the furcation tube 22(1) could receive the antenna wire 26 in the fiber optic connector assembly 10 in FIGS. 1A-3B if the duplex fiber optic cable 14(1) were employed as the fiber optic cable 14 in the fiber optic connector assembly 10. An inner diameter $D_3$ of the furcation tube 22(1) can be any diameter desired as long as the inner diameter $D_3$ is large enough to receive the antenna wire provided in a fiber optic connector assembly employing the duplex fiber optic cable 14(1). It may be desired to provide for the inner diameter $D_3$ of the furcation tube 22(1) to be larger than the outer diameter of an antenna wire such that the antenna wire is loose inside the furcation tube 22(1) when disposed inside the furcation tube 22(1). In this manner, the antenna wire is loose to be able to move or rotate in the furcation tube 22(1) when the duplex fiber optic cable 14(1) is bent to reduce forces on the antenna wire and/or avoid or reduce the potential for damage to the antenna wire. For example, the inner diameter $D_3$ of the furcation tube 22(1) may be designed to be at least 0.100 mm larger than the outer diameter of an antenna wire.

Figure 6:
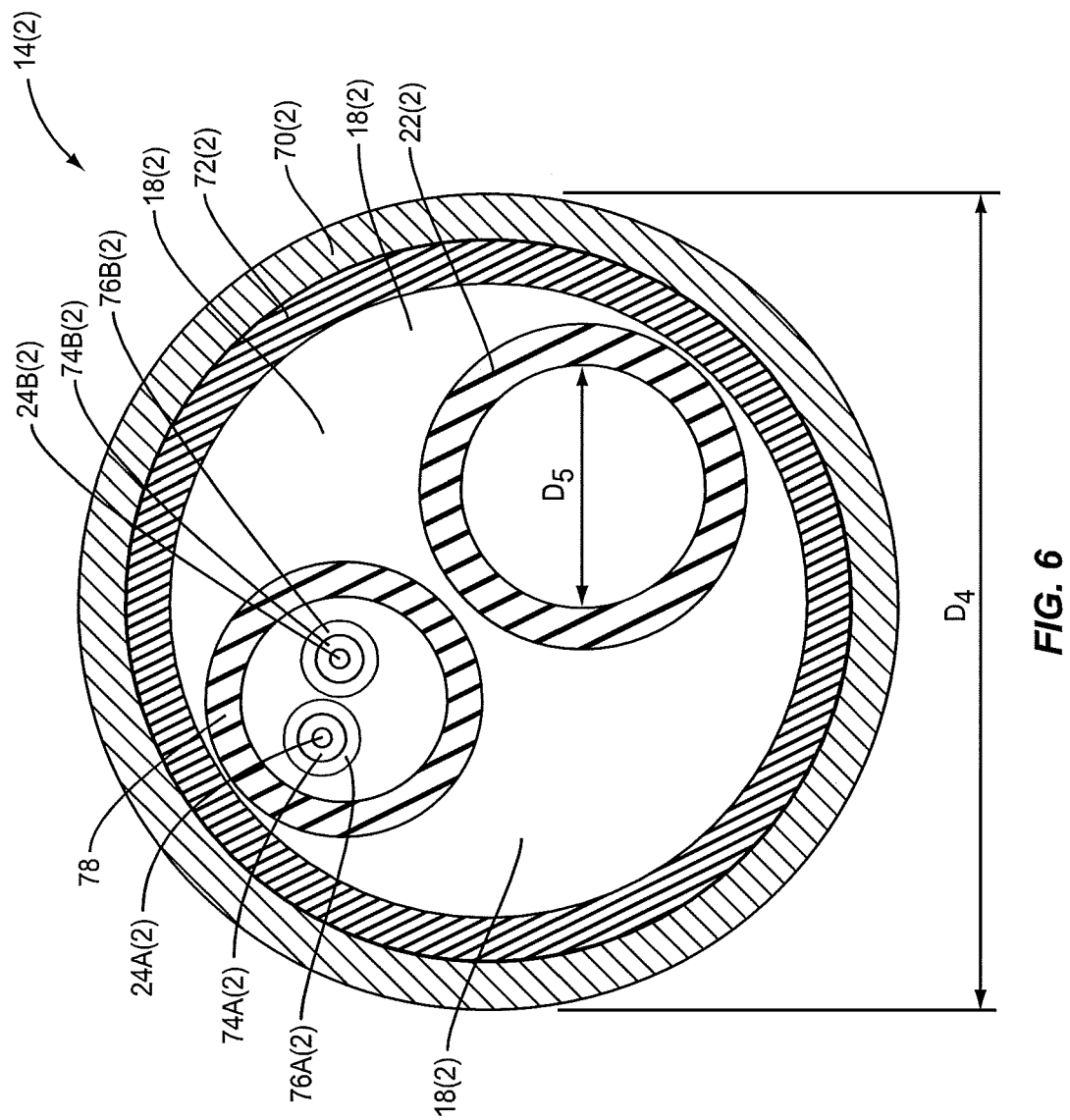
FIG. 6 is a front view of an alternative duplex fiber optic cable configured to receive at least a portion of an antenna wire of an RFID-equipped connector.

FIG. 6 is a front view of an alternative duplex fiber optic cable 14(2) configured to receive at least a portion of an antenna wire of an RFID-equipped connector. The antenna wire may be the antenna wire 26 in the fiber optic connector assembly 10 in FIGS. 1A-3B. Likewise, the RFID-equipped connector may be the duplex LC fiber optic connector 12 in FIGS. 1A-3B. With reference to FIG. 6, the duplex fiber optic cable 14(2) is provided. Similar to the duplex fiber optic cable 14(1) in FIG. 5, the duplex fiber optic cable 14(2) is comprised of an outer jacket 70(2) surrounding a strength member 72(2). For example, an outer diameter $D_4$ of the outer jacket 70(2) may be 3.3 millimeters (mm) or 2.0 mm, as examples. The strength member 72(2) may be comprised, for example, of a Kevlar® or other aramid material or any other material desired. Two optical fibers 24A(2), 24B(2) are disposed in an interior area 18(2) formed by the outer jacket 70(2) and strength member 72(2) to provide duplex communications capability.

In this embodiment, the two optical fibers 24A(2), 24B(2) include a core surrounded by a cladding 74A(2), 74B(2). A coating material 76A(2), 76B(2) is disposed around the cladding 74A(2), 74B(2) in this embodiment. For example, the coating material 76A(2), 76B(2) may be any material desired, such as an acrylate for example. In this example, the outer diameter of the optical fibers 24A(2), 24B(2) is one hundred twenty-five lam, and two hundred fifty (250) μm with the coating material 76A(2), 76B(2), but each can be of any diameter. The cladding 74A(2), 74B(2) and/or coating material 76A(2), 76B(2) could also be surrounded by a buffer material to be tightly buffered, if desired.

In distinction to the duplex fiber optic cable 14(1) in FIG. 5, the duplex fiber optic cable 14(2) in FIG. 6 includes an additional buffer tube 78 in which the optical fibers 24A(2), 24B(2) are disposed. Providing the buffer tube 78 keeps the optical fibers 24A(2), 24B(2) grouped together in the interior area 18(2) of the duplex fiber optic cable 14(2) and prevents the optical fibers 24A(2), 24B(2) from being damaged by any movement of a furcation tube 22(2) within the interior area 18(2).

With continuing reference to FIG. 6, the furcation tube 22(2) is also disposed in the interior area 18(2). The furcation tube 22(2) is configured to receive at least a portion of an antenna wire. For example, the furcation tube 22(2) could receive the antenna wire 26 in the fiber optic connector assembly 10 in FIGS. 1A-3B if the duplex fiber optic cable 14(2) were employed as the fiber optic cable 14 in the fiber optic connector assembly 10. An inner diameter $D_5$ of the furcation tube 22(2) can be any diameter desired as long as the inner diameter $D_5$ is large enough to receive the antenna wire provided in a fiber optic connector assembly employing the duplex fiber optic cable 14(2). It may be desired to provide for the inner diameter $D_5$ of the furcation tube 22(2) to be larger than the outer diameter of an antenna wire such that the antenna wire is loose inside the furcation tube 22(2) when disposed inside the furcation tube 22(2). In this manner, the antenna wire is loose to be able to move or rotate in the furcation tube 22(2) when the duplex fiber optic cable 14(2) is bent to reduce forces on the antenna wire and/or avoid or reduce the potential for damage to the antenna wire. For example, the inner diameter $D_5$ of the furcation tube 22(2) may be designed to be at least 0.100 mm larger than the outer diameter of an antenna wire.

Figure 7:
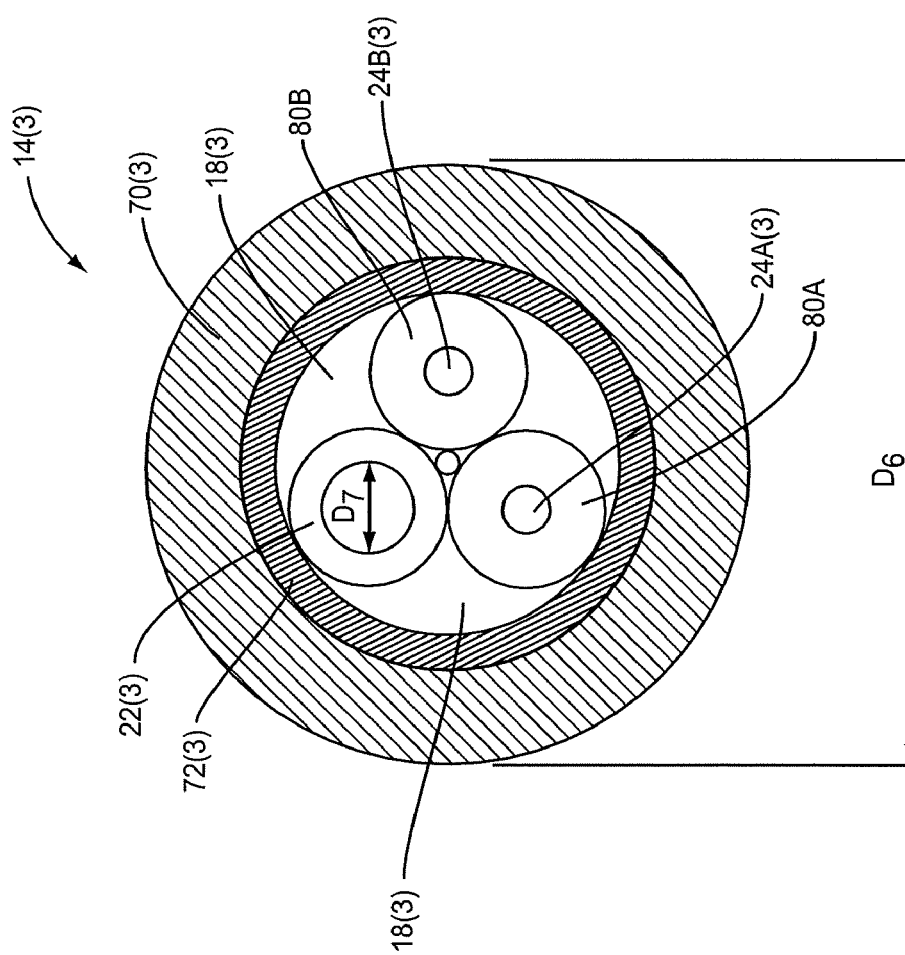
FIG. 7 is a front view of another alternative duplex fiber optic cable configured to receive at least a portion of an antenna wire of an RFID-equipped connector.

FIG. 7 is a front view of another alternative duplex fiber optic cable 14(3) configured to receive an antenna wire of an RFID-equipped connector. The antenna wire may be the antenna wire 26 in the fiber optic connector assembly 10 in FIGS. 1A-3B. Likewise, the RFID-equipped connector may be the duplex LC fiber optic connector 12 in FIGS. 1A-3B. With reference to FIG. 7, the duplex fiber optic cable 14(3) is provided. Similar to the fiber optic cable 14(1) in FIG. 5, the duplex fiber optic cable 14(3) is comprised of an outer jacket 70(3) surrounding a strength member 72(3). For example, an outer diameter $D_6$ of the outer jacket 70(3) may be 3.3 millimeters (mm) or 2.0 mm, as examples. The strength member 72(3) may be comprised, for example, of a Kevlar® or other aramid material or any other material desired. Two optical fibers 24A(3), 24B(3) are disposed in an interior area 18(3) formed by the outer jacket 70(3) and strength member 72(3) to provide duplex communications capability.

In this embodiment, the two optical fibers 24A(3), 24B(3) are surrounded with a buffer material 80A, 80B to form tight buffered optical fibers. In this example, the outer diameter of the optical fibers 24A(3), 24B(3) is one hundred twenty-five (125) μm, and nine hundred (900) μm with the buffer material 80A, 80B, but each can be of any diameter.

With continuing reference to FIG. 7, a furcation tube 22(3) is also disposed in the interior area 18(3). The furcation tube 22(3) is configured to receive at least a portion of an antenna wire. For example, the furcation tube 22(3) could receive the antenna wire 26 in the fiber optic connector assembly 10 in FIGS. 1A-3B if the duplex fiber optic cable 14(3) were employed as the fiber optic cable 14 in the fiber optic connector assembly 10. An inner diameter $D_7$ of the furcation tube 22(3) can be any diameter desired as long as the inner diameter $D_7$ is large enough to receive the antenna wire provided in the fiber optic connector assembly employing the duplex fiber optic cable 14(3). It may be desired to provide for the inner diameter $D_7$ of the furcation tube 22(3) to be larger than the outer diameter of an antenna wire such that the antenna wire is loose inside the furcation tube 22(3) when disposed inside the furcation tube 22(3). In this manner, the antenna wire is loose to be able to move or rotate in the furcation tube 22(3) when the duplex fiber optic cable 14(3) is bent to reduce forces on the antenna wire and/or avoid or reduce the potential for damage to the antenna wire. For example, the inner diameter $D_7$ of the furcation tube 22(3) may be designed to be at least 0.100 mm larger than the outer diameter of an antenna wire.

The fiber optic connector assembly 10 in FIGS. 1A-3B can also be configured to be connected to another fiber optic connector assembly 10 via an adapter arrangement 82, as illustrated in FIG. 8. In this example, the duplex LC fiber optic adapter 84 can be provided that provides an optical connection path between the optical fibers provided in each of two (2) duplex LC fiber optic connectors 12(1), 12(2) each like the duplex LC fiber optic connector 12 in FIGS. 1A-3B. As will be discussed in more detail below with regard to FIG. 9, the duplex LC fiber optic adapter 84 can also be designed to provide an electrical connection path between the RFID IC chips 56 in the RFID tags 28 provided in the two duplex LC fiber optic connectors 12(1), 12(2). The duplex LC fiber optic adapter 84 may also be RFID-equipped. In this manner, the duplex LC fiber optic connectors 12(1), 12(2) and the RFID-equipped duplex LC fiber optic adapter 84 can provide information about their connector or support fiber optic cable, or adapter, as the case may be, to an RFID reader. Further, the duplex LC fiber optic connectors 12(1), 12(2) and the duplex LC fiber optic adapter 84 can also communicate information to each other when a connection between them is established as previously discussed. For example, the duplex LC fiber optic connector 12(1) may communicate a unique identification (ID) to the duplex LC fiber optic adapter 84 when a connection is established. This allows an RFID reader, by interrogating the duplex LC fiber optic connector 12(1) and/or 12(2) and/or duplex LC fiber optic adapter 84, to be aware of the physical connection for any number of reasons, including connection mapping, etc., as previously discussed.

Figure 9:
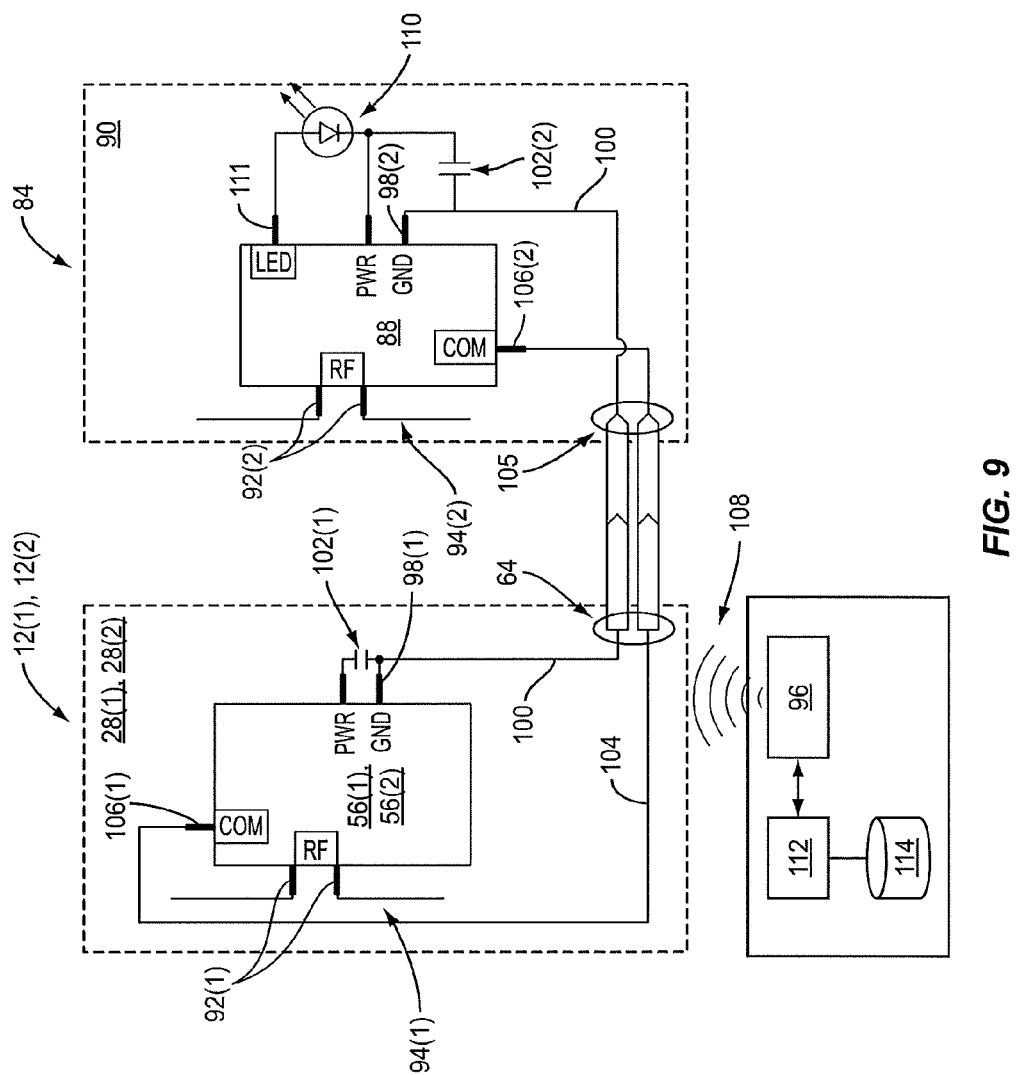
FIG. 9 is a schematic diagram of an exemplary circuit for communicatively coupling RFID-equipped integrated circuit (IC) chips forming RFID tags disposed in connected RFID-equipped connectors and/or adapters, wherein the RFID tags may be configured to communicate data via radio-frequency (RF) communications to an RFID reader.

To provide further detail regarding how RFID tags provided in a fiber optic connector assembly 10(1), 10(2) may be communicatively coupled with an RFID tag provided in the duplex LC fiber optic adapter 84 in FIG. 8, FIG. 9 is provided. FIG. 9 illustrates more detail on an exemplary IC chip and pin layout of an IC chip for an RFID tag connected to an IC chip of another RFID tag. In this regard, the RFID tag in the fiber optic connector may be RFID tag 28(1) or RFID tag 28(2), as illustrated in FIG. 9, which are disposed in the duplex LC fiber optic connectors 12(1) or 12(2), respectively, as illustrated in FIG. 8. IC chip 56(1) or 56(2) provided in the RFID tag 28(1) or 28(2) is electrically and communicatively coupled to an IC chip 88 provided as part of an RFID tag 90 in the duplex LC fiber optic adapter 84 when the duplex LC fiber optic connector 12(1) or 12(2) is connected to the duplex LC fiber optic adapter 84, as illustrated in FIG. 8. The IC chips 56(1) or 56(2) and IC chip 88 form an RFID tag and an antenna interface adapted to be coupled to antennas to communicate wirelessly using RF communications.

Each IC chip 56(1) or 56(2) and 88 contains RF inputs in the form of RF input pins 92(1), 92(2) configured to couple to an antenna 94(1), 94(2). The antennas 94(1), 94(2) coupled to the IC chips 56(1) or 56(2) and 88 are configured to receive RF communication signals from an RFID reader 96 via the RF input pins 92(1), 92(2). Note that the RF input pins 92(1), 92(2) can also support any type of antenna, including dipole antenna, monopole antenna, or any other type of antenna. An antenna coupled to the RF input pins 92(1), 92(2) may be configured to operate at any frequency desired, including 2.4 GHz and 900 MHz, as examples.

As further illustrated in FIG. 9, the RFID-enabled IC chips 56(1) or 56(2) and 88 can be designed to be coupled in a daisy-chain fashion. Ground (GND) is coupled together for each IC chip 56(1) or 56(2) and 88 when a connection is established by coupling ground pins 98(1), 98(2) of the IC chips 56(1) or 56(2) and 88 together via ground line 100. One or more capacitors 102(1), 102(2) may be coupled between power (PWR) and GND to provide storage of energy harvested from the RF signals received from the antennas 94(1), 94(2). As also illustrated in FIG. 9, the IC chips 56(1) or 56(2) and 88 are configured to communicate with each other over a serial bus communication line 104 via connections between the electrical contacts 64 and electrical contacts 105 provided in the duplex LC fiber optic adapter 84. Each IC chip 56(1) or 56(2) and 88 contains at least one communication pin 106(1), 106(2). Each communication pin 106(1), 106(2) allows serial communications to and from the IC chips 56(1) or 56(2).

Activating the RFID-enabled IC chips 56(1) or 56(2) and 88 allows information to be provided to the RFID reader 96 in response to an interrogation signal 108. However, note that if the IC chips 56(1) or 56(2) and 88 are connected together, an electrical connection between the IC chips 56(1) or 56(2) and 88 is still made and information between the IC chips 56(1) or 56(2) and 88 can be exchanged without interrogation by the RFID reader 96. In response to a condition change or activation, the RFID reader 96 may also communicate to the RFID tag 28(1), 28(2), and/or 90 to cause a light source 110, such as a light emitting diode (LED) or other light source coupled to an LED pin 111. Other examples of light sources that may comprise the light source 110 include a liquid crystal display (LCD), and an electroluminescent display. The light source 110 may be powered by energy from the interrogation signal 108 transmitted by the RFID reader 96.

FIG. 9 also illustrates an example of the RFID reader 96, as discussed above. In this example, the RFID reader 96 is configured to transmit the interrogation signal 108. The RFID reader 96 is also configured to receive information, such as identity information pairs signifying connection of duplex LC fiber optic connectors 12(1), 12(2) with each other and/or with the duplex LC fiber optic adapter 84, within the range of the RFID reader 96. This information can be processed in a component management system 112 as an example. The component management system 112 may include control systems and related software for processing the information received to perform a number of tasks. These tasks include, but are not limited to, recording the identity information pairs, providing identity information pairs information to a technician, recording connectors which are not mated, and providing other troubleshooting and diagnostic information, as will be described in greater detail below. Furthermore, the component management system 112, and any associated database 114, includes stored information relating to one or more RFID tags 28(1), 28(2), 90 in order to facilitate identification, mapping, or other processing of the information therefrom. More specifically, the RFID reader 96 includes information that correlates a unique identification number of an RFID tag 28(1), 28(2), 90 to a particular duplex LC fiber optic connector 12(1), 12(2) and/or duplex LC fiber optic adapter 84.

Figure 10:
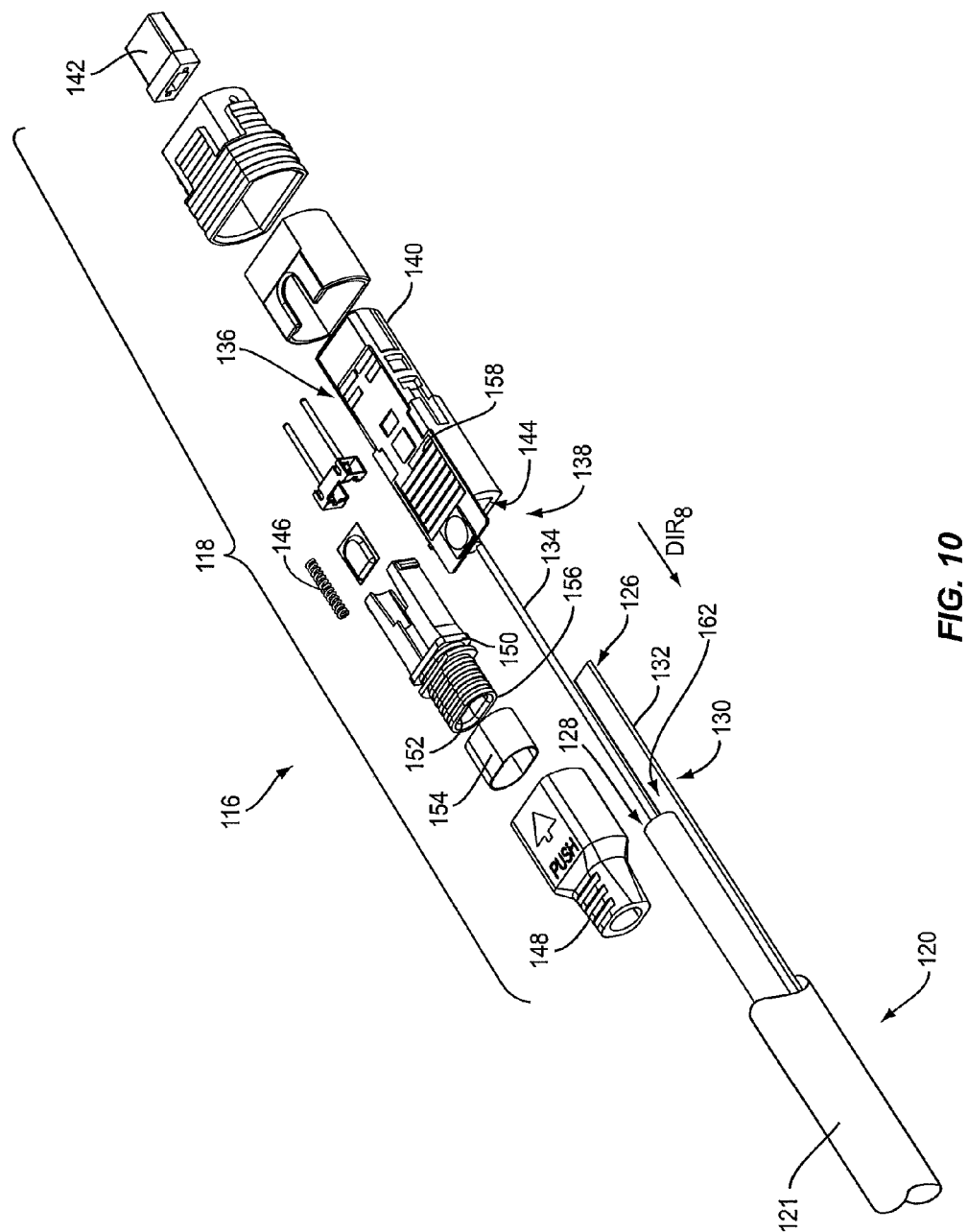
FIG. 10 is a top, perspective exploded view of an exemplary RFID-equipped MTP fiber optic connector assembly including an MTP fiber optic connector and fiber optic cable having a furcation tube configured to receive an antenna wire of the RFID-equipped MTP fiber optic connector.

Other types of connectors can also be RFID-equipped and provided in an assembly that includes a furcation tube disposed in a cable to receive at least a portion of an antenna wire from the connectors. In this regard, FIG. 10 is a top, perspective exploded view of an exemplary MTP fiber optic connector assembly 116. In this embodiment, as will be discussed in more detail below, the MTP fiber optic connector assembly 116 is RFID-equipped. In this example, the MTP fiber optic connector assembly 116 is comprised of an MTP fiber optic connector 118 and a fiber optic cable 120. The fiber optic cable 120 comprises a cable end 122. The MTP fiber optic connector 118 is operable connected to the cable end 122, as illustrated in FIG. 11.

Figure 11:
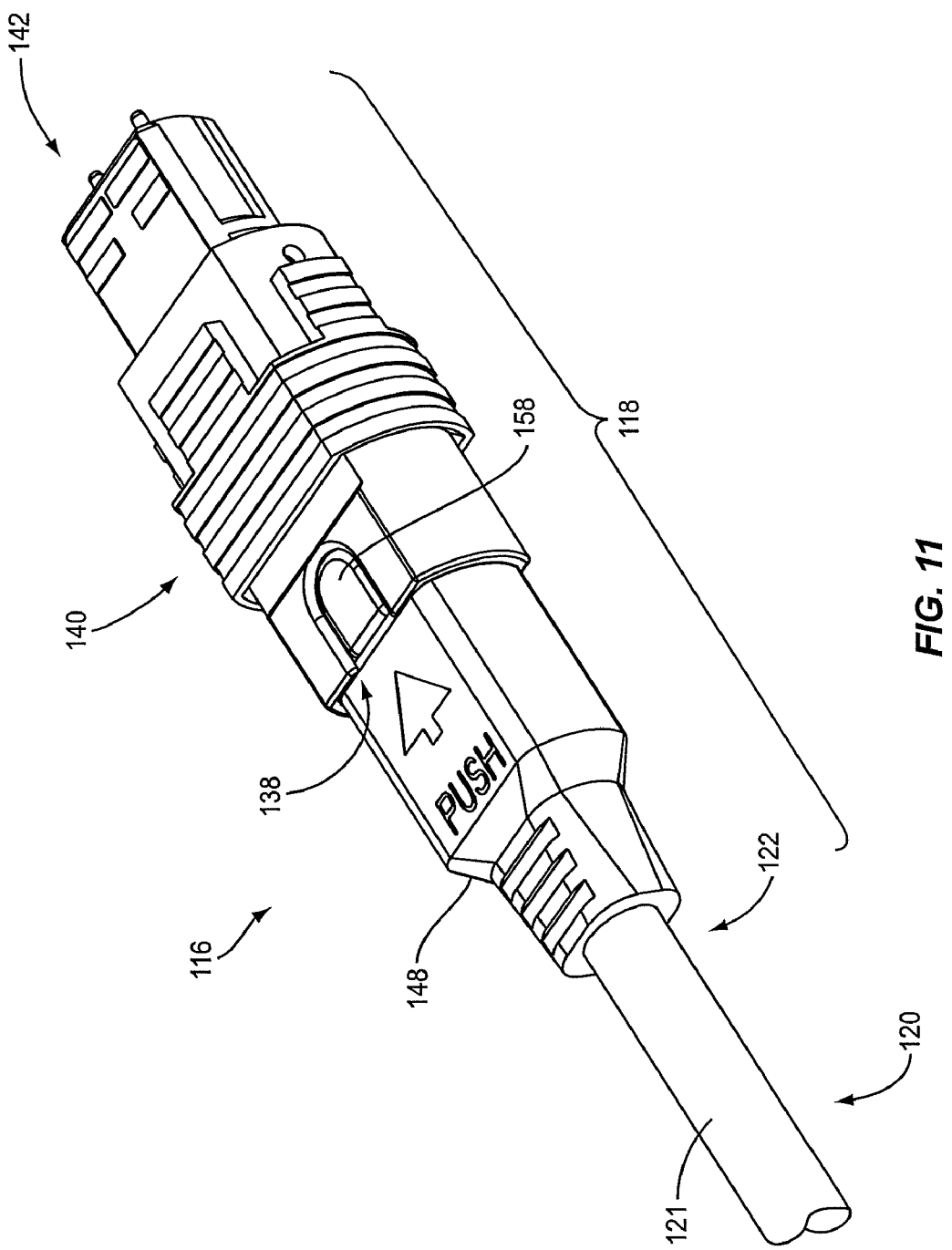
FIG. 11 is a rear, perspective exploded view of the RFID-equipped MTP fiber optic connector and fiber optic cable of FIG. 10.

FIG. 11 illustrates the MTP fiber optic connector assembly 116 in FIG. 10 fully assembled. As illustrated in FIG. 12A and FIG. 12B, which is an enlarged view of FIG. 12A, and described in more detail below, the fiber optic cable 120 comprises an outer jacket 121 providing an interior area 124. Communication lines 126 and a furcation tube 128 are disposed in the interior area 124. For example, as illustrated in FIG. 10, the communication lines 126 comprise twelve (12) optical fibers 130 provided in a single ribbon cable 132. Note that any number of optical fibers 130 could be provided in the ribbon cable 132, such as between four (4) and twenty-four (24) optical fibers as an example. Alternatively, the fibers may be in a loose configuration within the fiber optic cable 120 and ribbonized only on the ends protruding from the cable end 122 to facilitate connectorization. As illustrated in FIGS. 10-12B as will be described in more detail below, the MTP fiber optic connector assembly 116 is configured such the furcation tube 128 can receive at least a portion of an antenna wire 134. The antenna wire 134 is configured to be electrically connected to an RFID transponder or tag 136 (referred to as "RFID tag 136") disposed in the MTP fiber optic connector 118. The antenna wire 134 serves at least a portion of an RFID antenna 138 for the RFID tag 136.

With continuing reference to FIGS. 10, 12A, and 12B, the MTP fiber optic connector 118 contains a housing 140 configured to hold a ferrule 142 receiving the optical fibers 130. The optical fibers 130 are exposed from the cable end 122 and inserted through a housing passage 152 of a housing 150 and an inlet opening 144 in the housing 140 to be routed through the ferrule 142. Additionally, a spring 146 is provided to spring-load the ferrule 142. The cable end 122 is placed through a boot 148 that provides bend relief. The housing 150 is connected to the boot 148 and configured to receive the cable end 122 extending through the boot 148 through the housing passage 152. To secure the cable end 122 to the housing 150, a crimp band 154 is provided to secure the cable end 122 to a crimp boss 156 of the housing 150. The housing 150 is attached to the housing 140 to complete the connector assembly. As will be described in more detail below, the housing 140 of the MTP fiber optic connector 118 is also configured to receive a printed circuit board (PCB) 158. The PCB 158 contains traces, electronic devices, and/or antenna components configured to be electrically connected to the antenna wire 134 and to provide the RFID tag 136 in the MTP fiber optic connector 118.

FIGS. 12A and 12B are perspective cross-section views of the MTP fiber optic connector assembly 116 of FIGS. 10 and 11 to provide more detail regarding disposition of the antenna wire 134 in the furcation tube 128 provided in the fiber optic cable 120. FIG. 12B is a close-up view of the cross-section view of the MTP fiber optic connector assembly 116 illustrated in FIG. 12A. In this regard, the antenna wire 134 is connected to the PCB 158 to form at least a part of the RFID antenna 138 for the RFID tag 136. The antenna wire 134 is provided as a pigtail. The antenna wire 134 may be of any length. As an example, the antenna wire 134 may be one hundred (100) millimeters (mm) in length.

Before the cable end 122 is secured to the crimp boss 156 of the housing 150, an end 160 of the antenna wire 134 is inserted into an inlet opening 162 of the furcation tube 128. As the cable end 122 is moved forward towards the connector 118, the antenna wire 134 moves in a direction $DIR_S$ inside the furcation tube 128 until the cable end 122 is secured to the crimp boss 156 of the housing 150, as illustrated in FIG. 10. In this manner, the antenna wire 134 is protected inside the furcation tube 128. Because the furcation tube 128 is disposed inside the fiber optic cable 120, bend relief to the antenna wire 134 is provided by the fiber optic cable 120 when the cable end 122 is bent. The boot 148 also serves to provide bend relief for the antenna wire 134. In this embodiment, the furcation tube 128 extends at least partially into the housing passage 152 of the housing 150 to provide protection for the antenna wire 134 as it extends from the housing 150 and into the fiber optic cable 120.

The furcation tube 128 is any tube or enclosure configured to receive an antenna wire. The furcation tube 128 may be of any size inner or outer diameter desired. The furcation tube 128 may be constructed out of any material desired. For example, the furcation tube 128 may be constructed out of a polymer, such as a polyvinylidene fluoride (PVDF), as an example. It may be desired to construct the furcation tube 128 out of a material that provides low friction between the antenna wire 134 and the furcation tube 128 to facilitate easy insertion of the antenna wire 134 into the furcation tube 128 and to avoid kinking and damaging the antenna wire 26 during insertion.

Figure 13:
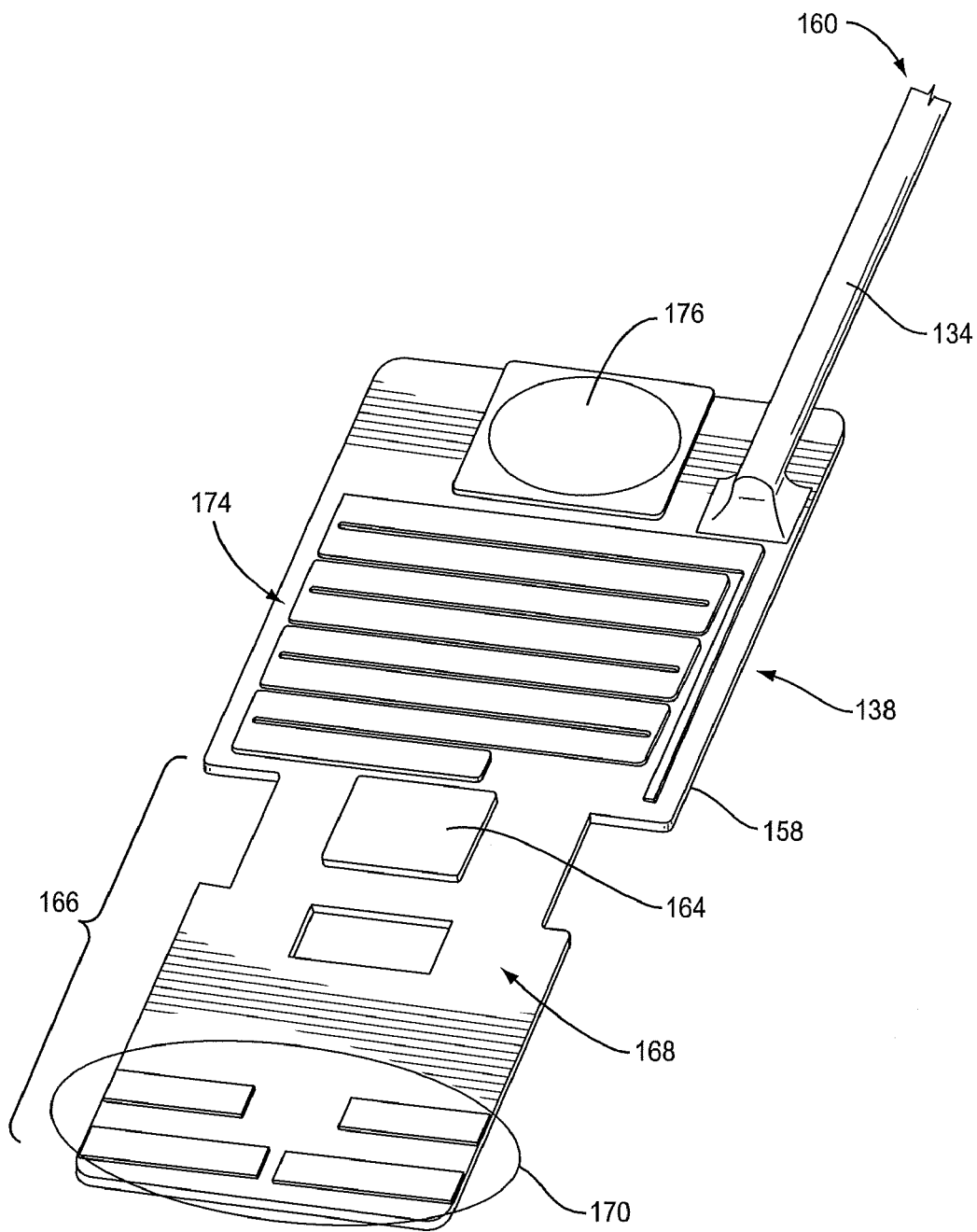
FIG. 13 is a schematic diagram of an exemplary PCB configured to be disposed in the MTP fiber optic connector in FIG. 10 to provide an integrated RFID circuit and RFID-equipped MTP fiber optic connector.
Figure 16:
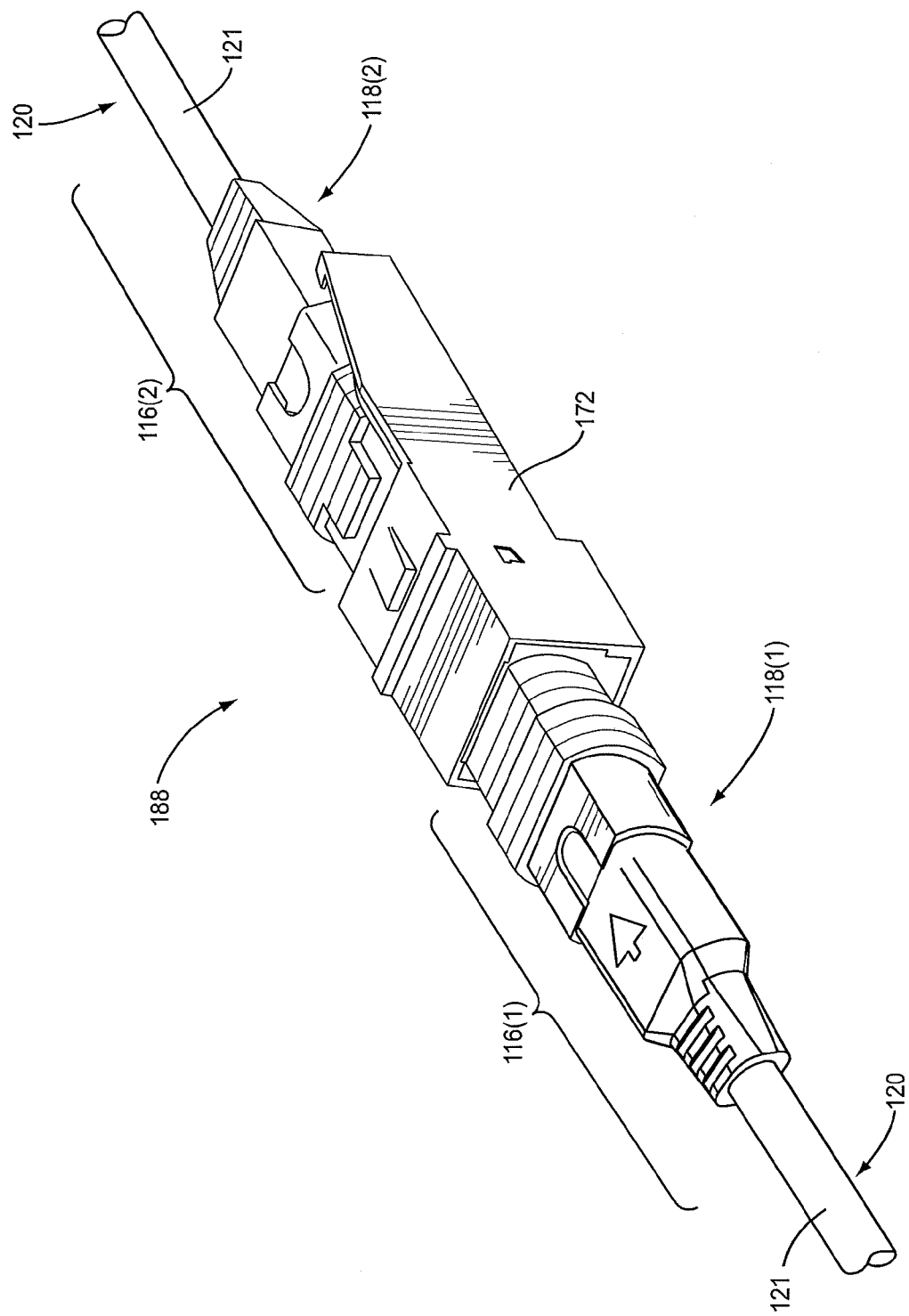
FIG. 16 is a top, perspective exploded view of two (2) RFID-equipped MTP fiber optic connector assemblies of FIG. 11 connected through an intermediary fiber optic adapter.

FIG. 13 illustrates the PCB 158 disposed in the MTP fiber optic connector 118 in FIGS. 10-12B in more detail. The PCB 158 establishes the circuit for the RFID tag 136 disposed in the housing 140 of the MTP fiber optic connector 118. The PCB 158 contains an RFID IC chip 164 in a front portion 166 of the PCB 158. Traces 168 provided in the front portion 166 of the PCB 158 connect pins of the RFID IC chip 164 to electrical contacts 170 contained on the PCB 158. These electrical contacts 170 are configured to establish electrical connections to the RFID IC chip 164 when the MTP fiber optic connector 118 is connected to a compatible MTP fiber optic adapter 172, as illustrated in FIG. 16 and described in more detail below. With reference to FIG. 13, the RFID IC chip 164 is also coupled to an antenna matrix 174 provided in the PCB 158, which is coupled to the antenna wire 134 extending out from the PCB 158. The antenna matrix 174 provides a wire loop antenna integrated into the PCB 158 to provide RF signal frequency tuning for signals received on the antenna wire 134. An activation button 176 can also be provided to enable the RFID IC chip 164 to allow the RFID IC chip 164 provide information through the RFID antenna 138 to an RFID reader, such as identification information for example.

The RFID tag 136 provided in the MTP fiber optic connector assembly 116 may include active operation, semi-passive operation, or passive operation. Active RFID tags include a transmitter and thus also include a power source to power the transmitter. Semi-passive RFID tags include a power source, but do not include a transmitter. The power source provides power for an integrated circuit in the RFID tag to process received RF signals and reflect or backscatter the received RF signals over an antenna to an RFID reader. Passive RFID tags also receive RF signals and provide communications to RFID readers by reflecting or backscattering the received RF signals over an antenna. However, passive RFID tags do not include their own power source. Rather, passive RFID tags harvest energy from received RF signals to provide power. The connector assemblies disclosed herein may be particularly suitable for passive RFID tags, because antenna wires for passive RFID tags may be required to be longer in length to increase the ability of the RFID tag to harvest power from RF signals. Thus, the longer length antenna wires for passive RFID tags employed in connector assemblies may extend outside connector housings and thus benefit from being at least partially disposed in a cable provided as part of the cable assembly.

The fiber optic cable 120 arrangement and furcation tube 128 disposed therein in FIGS. 10-12B can take any form or configuration desired. For example, FIGS. 14 and 15 discussed below provide two (2) examples of fiber optic cables 120(1) and 120(2), respectively, that each includes a furcation tube 128(1) and 128(2) to receive at least a portion of an antenna wire. The fiber optic cables 120(1) and 120(2) in FIGS. 14 and 15 may be employed in the MTP fiber optic connector assembly 116 in FIGS. 1A-3B.

Figure 14:
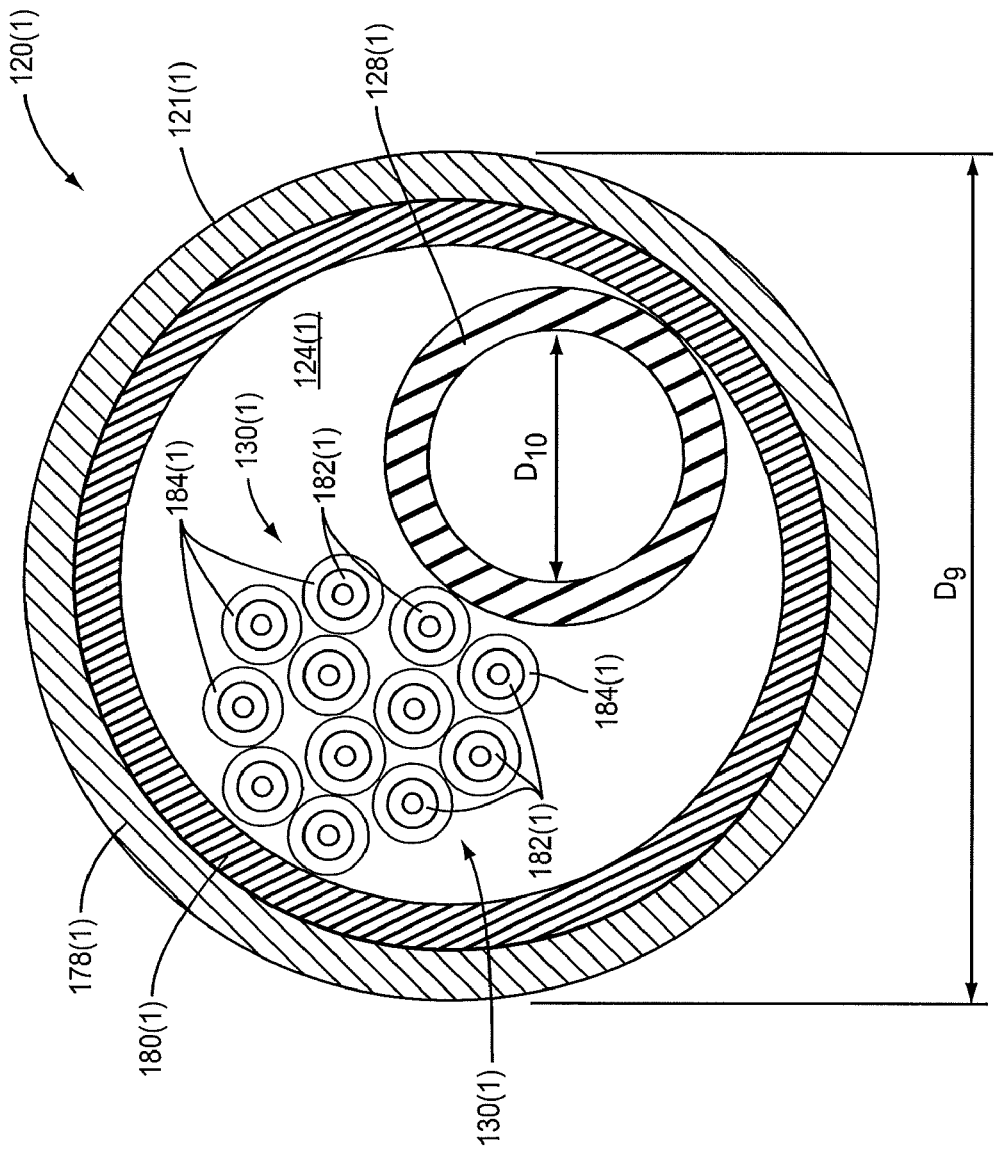
FIG. 14 is a front view of an exemplary fiber optic cable configured to receive at least a portion of an antenna wire of an RFID-equipped connector.

FIG. 14 is a front view of a first exemplary fiber optic cable 120(1) configured to receive at least a portion of an antenna wire of an RFID-equipped connector. The antenna wire may be the antenna wire 134 in the MTP fiber optic connector assembly 116 in FIGS. 10-12B. Likewise, the RFID-equipped connector may be the MTP fiber optic connector 118 in FIGS. 10-12B. With reference to FIG. 14, the fiber optic cable 120(1) is provided. The fiber optic cable 120(1) is comprised of an outer jacket 178(1) surrounding a strength member 180(1). For example, an outer diameter $D_9$ of the outer jacket 178(1) may be 3.3 millimeters (mm) or 2.0 mm, as examples. The strength member 180(1) may be comprised, for example, of a Kevlar® or other aramid material or any other material desired. Twelve (12) optical fibers 130(1) are disposed in an interior area 124(1) formed by the outer jacket 178(1) and strength member 180(1) to provide multiplex communications capability.

In this embodiment, the optical fibers 130(1) comprise a core surrounded by a cladding 182(1). A coating material 184(1) is disposed around the cladding 182(1) in this embodiment. For example, the coating material 184(1) may be any material desired, such as an acrylate for example. In this example, the outer diameter of each of the optical fibers 130(1) is one hundred twenty-five (125) µm, and two hundred fifty (250) µm with the coating material 184(1), but each can be of any diameter. The cladding 182(1) and/or coating material 184(1) could also be surrounded by a buffer material to be tightly buffered, if desired.

With continuing reference to FIG. 14, a furcation tube 128(1) is also disposed in the interior area 124(1). The furcation tube 128(1) is configured to receive at least a portion of an antenna wire. For example, the furcation tube 128(1) could receive the antenna wire 134 in the MTP fiber optic connector assembly 116 in FIGS. 10-12B if the fiber optic cable 120(1) were employed as the fiber optic cable 120 in the MTP fiber optic connector assembly 116. An inner diameter $D_{10}$ of the furcation tube 128(1) can be any diameter desired as long as the inner diameter $D_{10}$ is large enough to receive the antenna wire provided in a fiber optic connector assembly employing the fiber optic cable 120(1). It may be desired to provide for the inner diameter $D_{10}$ of the furcation tube 128(1) to be larger than the outer diameter of an antenna wire such that the antenna wire is loose inside the furcation tube 128(1) when disposed inside the furcation tube 128(1). In this manner, the antenna wire is loose to be able to move or rotate in the furcation tube 128(1) when the fiber optic cable 120(1) is bent to reduce forces on the antenna wire and/or avoid or reduce the potential for damage to the antenna wire. For example, the inner diameter $D_{10}$ of the furcation tube 128(1) may be designed to be at least 0.100 mm larger than the outer diameter of an antenna wire.

Figure 15:
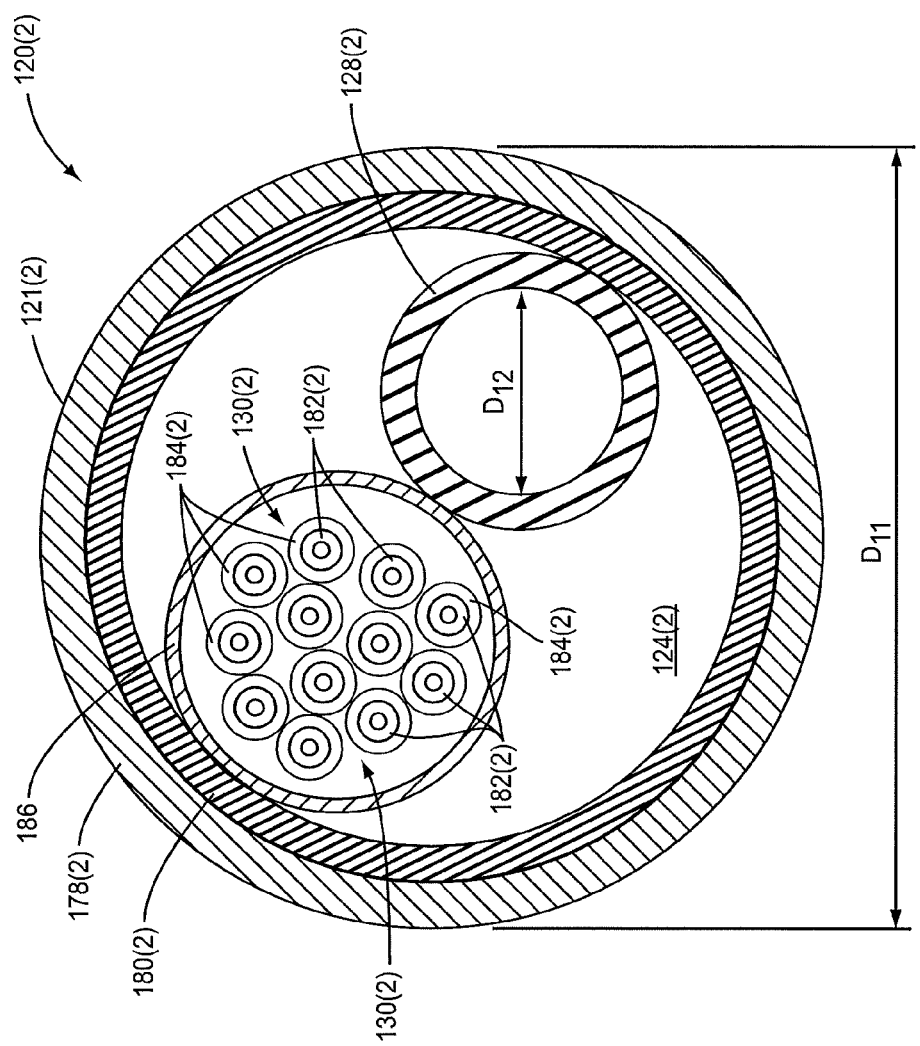
FIG. 15 is a front view of an alternative exemplary fiber optic cable configured to receive at least a portion of an antenna wire of an RFID-equipped connector.

FIG. 15 is a front view of an alternative fiber optic cable 120(2) configured to receive at least a portion of an antenna wire of an RFID-equipped connector. The antenna wire may be the antenna wire 134 in the MTP fiber optic connector assembly 116 in FIGS. 10-12B. Likewise, the RFID-equipped connector may be the MTP fiber optic connector 118 in FIGS. 10-12B. With reference to FIG. 15, the fiber optic cable 120(2) is provided. Similar to the fiber optic cable 120(1) in FIG. 14, the fiber optic cable 120(2) is comprised of an outer jacket 178(2) surrounding a strength member 180(2). For example, an outer diameter $D_{11}$ of the outer jacket 178(2) may be 3.3 mm or 2.0 mm, as examples. The strength member 180(2) may be comprised, for example, of a Kevlar® or other aramid material or any other material desired. Twelve (12) optical fibers 130(2) are disposed in an interior area 124(2) formed by the outer jacket 178(2) and strength member 180(2) to provide multiplex communications capability.

In this embodiment, the optical fibers 130(2) comprise a core surrounded by a cladding 182(2). A coating material 184(2) is disposed around the cladding 182(2) in this embodiment. For example, the coating material 184(2) may be any material desired, such as an acrylate for example. In this example, the outer diameter of each of the optical fibers 130(2) is one hundred twenty-five (125) µm, and two hundred fifty (250) µm with the coating material 184(2), but each can be of any diameter. The cladding 182(2) and/or coating material 184(2) could also be surrounded by a buffer material to be tightly buffered, if desired.

In distinction to the fiber optic cable 120(1) in FIG. 14, the fiber optic cable 120(2) in FIG. 15 includes an additional buffer tube 186 in which the optical fibers 130(2) are disposed. Providing the buffer tube 186 keeps the optical fibers 130(2) grouped together in the interior area 124(2) of the fiber optic cable 120(2) and prevents the optical fibers 130(2) from being damaged by any movement of a furcation tube 128(2) within the interior area 124(2).

With continuing reference to FIG. 15, the furcation tube 128(2) is also disposed in the interior area 124(2). The furcation tube 128(2) is configured to receive at least a portion of an antenna wire. For example, the furcation tube 128(2) could receive the antenna wire 134 in the MTP fiber optic connector assembly 116 in FIGS. 10-12B if the fiber optic cable 120(2) were employed as the fiber optic cable 120 in the MTP fiber optic connector assembly 116. An inner diameter $D_{12}$ of the furcation tube 128(2) can be any diameter desired as long as the inner diameter $D_{12}$ is large enough to receive the antenna wire provided in a fiber optic connector assembly employing the fiber optic cable 120(2). It may be desired to provide for the inner diameter $D_{12}$ of the furcation tube 128(2) to be larger than the outer diameter of an antenna wire such that the antenna wire is loose inside the furcation tube 128(2) when disposed inside the furcation tube 128(2). In this manner, the antenna wire is loose to be able to move or rotate in the furcation tube 128(2) when the fiber optic cable 120(2) is bent to reduce forces on the antenna wire and/or avoid or reduce the potential for damage to the antenna wire. For example, the inner diameter $D_{12}$ of the furcation tube 128(2) may be designed to be at least 0.100 mm larger than the outer diameter of an antenna wire.

The MTP fiber optic connector assembly 116 in FIGS. 10-12B can also be configured to be connected to another MTP fiber optic connector assembly 116 via an adapter arrangement 188, as illustrated in FIG. 16. In this example, the MTP fiber optic adapter 172 can be provided that provides an optical connection path between the optical fibers provided in each of two (2) MTP fiber optic connectors 118(1), 118(2) each like the MTP fiber optic connector 118 in FIGS. 10-12B. As previously discussed and illustrated in FIG. 9, which is also applicable here, the MTP fiber optic adapter 172 can also be designed to provide an electrical connection path between the RFID IC chips 164 in RFID tags 136 provided in the two (2) fiber optic connectors 118(1), 118(2). The MTP fiber optic adapter 172 may also be RFID-equipped. In this manner, the MTP fiber optic connectors 118(1), 118(2) and the MTP fiber optic adapter 172 are RFID-equipped to provide information about their connector or support fiber optic cable, or adapter, as the case may be, to an RFID reader. Further, the MTP fiber optic connectors 118(1), 118(2) and the MTP fiber optic adapter 172 can also communicate information to each other when a connection between them is established as previously discussed. For example, the MTP fiber optic connector 118(1) may communicate a unique identification (ID) to the MTP fiber optic adapter 172 when a connection is established. This allows an RFID reader, by interrogating the fiber optic connector 118(1) and/or 118(2), and/or the MTP fiber optic adapter 172, to be aware of the physical connection for any number of reasons, including connection mapping, etc., as previously discussed.

Further detail regarding how RFID tags provided in a fiber optic connector assembly 116(1), 116(2) may be communicatively coupled with an RFID tag provided in the MTP fiber optic adapter 172 in FIG. 16 was previously discussed and illustrated in FIG. 9. In this regard, FIG. 9 is applicable for the adapter arrangement 188 and MTP fiber optic connector assemblies 116(1), 116(2) and MTP fiber optic adapter 172 in FIG. 16.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about 1 micron, said depressed-index annular portion being spaced from said core by at least about 0.5 microns.

In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture of greater than 0.14, more preferably greater than 0.17, even more preferably greater than 0.18, and most preferably greater than 0.185, and an overfilled bandwidth greater than 1.5 GHz-km at 850 nm.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture ("NA") of the optical fiber is preferably less than 0.23 and greater than 0.17, more preferably greater than 0.18, and most preferably less than 0.215 and greater than 0.185.

In some embodiments, the core extends radially outwardly from the centerline to a radius R1, wherein $10<R1<40$ microns, more preferably 20<R1<40 microns. In some embodiments, 22<R1<34 microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 17:
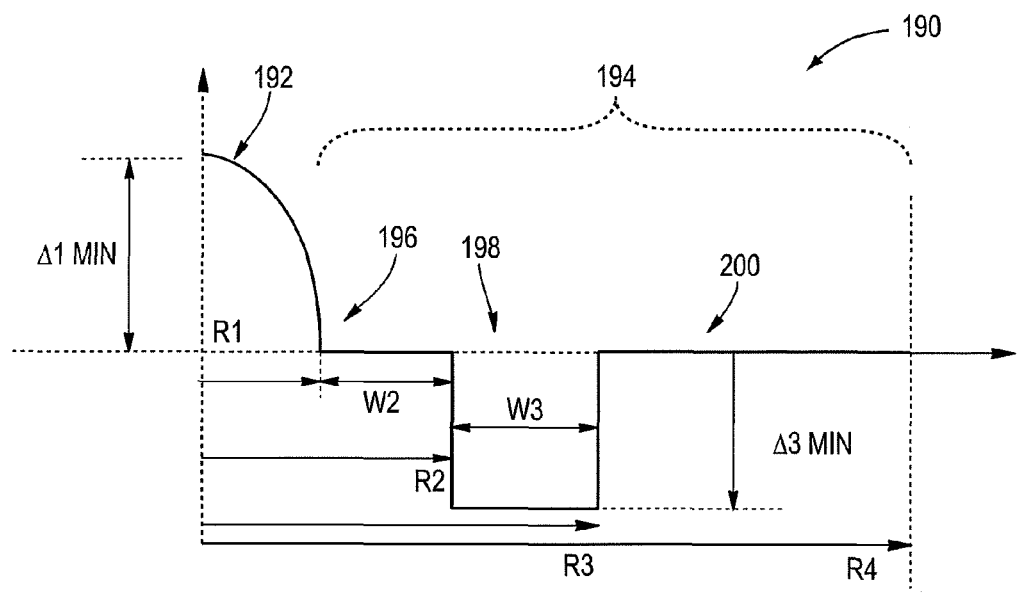
FIG. 17 shows a schematic representation (not to scale) of a refractive index profile of a cross-section of a glass portion of an exemplary embodiment of multimode optical fiber disclosed herein wherein a depressed-index annular portion is offset from a core and is surrounded by an outer annular portion.
Figure 18:
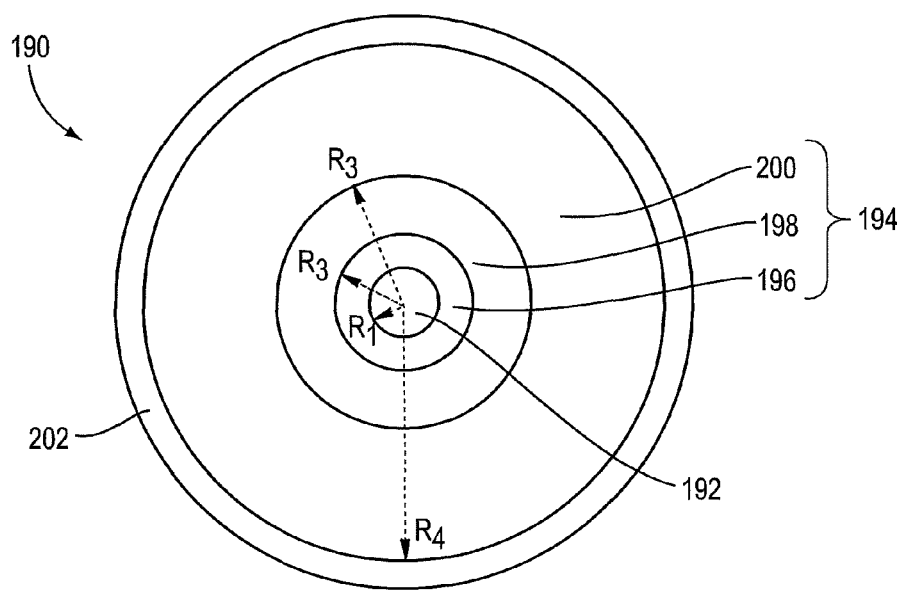
FIG. 18 is a schematic representation (not to scale) of a cross-sectional view of an optical waveguide fiber of FIG. 17.

FIG. 17 shows a schematic representation of the refractive index profile of a cross-section of the glass portion of an embodiment of a multimode optical fiber 190 comprising a glass core 192 and a glass cladding 194, the cladding comprising an inner annular portion 196, a depressed-index annular portion 198, and an outer annular portion 200. FIG. 18 is a schematic representation (not to scale) of a cross-sectional view of the optical waveguide fiber of FIG. 17. The core 192 has outer radius R1 and maximum refractive index delta Δ1MAX. The inner annular portion 196 has width W2 and outer radius R2. Depressed-index annular portion 198 has minimum refractive index delta percent Δ3MIN, width W3 and outer radius R3. The depressed-index annular portion 198 is shown offset, or spaced away, from the core 192 by the inner annular portion 196. The depressed-index annular portion 198 surrounds and contacts the inner annular portion 196. The outer annular portion 200 surrounds and contacts the depressed-indexed annular portion 198. The clad layer 194 is surrounded by at least one coating 202, which may in some embodiments comprise a low modulus primary coating and a high modulus secondary coating.

The inner annular portion 196 has a refractive index profile Δ2(r) with a maximum relative refractive index Δ2MAX, and a minimum relative refractive index Δ2MIN, where in some embodiments Δ2MAX=Δ2MIN. The depressed-index annular portion 198 has a refractive index profile Δ3(r) with a minimum relative refractive index Δ3MIN. The outer annular portion 200 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 196 has a substantially constant refractive index profile, as shown in FIG. 18 with a constant Δ2(r); in some of these embodiments, Δ2(r)=0%. In some embodiments, the outer annular portion 200 has a substantially constant refractive index profile, as shown in FIG. 18 with a constant Δ4(r); in some of these embodiments, Δ4(r)=0%. The core 192 has an entirely positive refractive index profile, where Δ1(r)>0%. R1 is defined as the radius at which the refractive index delta of the core first reaches value of 0.05%, going radially outwardly from the centerline. Preferably, the core 192 contains substantially no fluorine, and more preferably the core 192 contains no fluorine. In some embodiments, the inner annular portion 196 preferably has a relative refractive index profile Δ2(r) having a maximum absolute magnitude less than 0.05%, and Δ2MAX<0.05% and Δ2MIN>−0.05%, and the depressed-index annular portion 198 begins where the relative refractive index of the cladding first reaches a value of less than −0.05%, going radially outwardly from the centerline. In some embodiments, the outer annular portion 200 has a relative refractive index profile Δ4(r) having a maximum absolute magnitude less than 0.05%, and Δ4MAX<0.05% and Δ4MIN>−0.05%, and the depressed-index annular portion 198 ends where the relative refractive index of the cladding first reaches a value of greater than −0.05%, going radially outwardly from the radius where Δ3MIN is found.

Many modifications and other embodiments of the embodiments set forth herein will come to mind to one skilled in the art to which the embodiments pertain having the benefit of the teachings presented in the foregoing descriptions and the associated drawings. For example, fiber optic connector assemblies are disclosed herein. However, the connector assembly does not have to include optical fibers. The connector assembly could include any type of communication line, including for example electrical. In this regard, the cables disclosed herein having at least one furcation tube disposed therein are not limited to fiber optic cables. The cables could include electrical cables, power cables, or any other type of cables. The cables could include more than one type of cable or communication line disposed there, such as a cable including both optical fibers and copper wires as an example. Further, the connector and adapter types disclosed herein are not limited. For example, duplex LC and MTP fiber optic connectors and adapters are disclosed herein. However, if the connectors and adapters are fiber optic connectors and adapters, other types may be provided, including but not limited to FC, SC, ST, and MPO, as examples. The terms "connector" and "adapter" are not limited. A "connector" can be provided in any form or package desired that is capable of providing a connection to allow one or more communications lines to be communicatively connected or coupled to other communications lines disposed in another adapter or connector in which the connector is attached.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A connector assembly, comprising:
    a cable comprising a cable end, an interior area, at least one communication line, and at least one furcation tube disposed in the interior area;
    a connector operably connected to the cable end; and
    at least one antenna wire configured to be electrically connected to at least one radio-frequency identification (RFID) tag to serve as at least a portion of an RFID antenna for the at least one RFID tag;
    wherein at least a portion of the at least one antenna wire is disposed inside the at least one furcation tube.

2. The connector assembly of claim 1, wherein the cable is comprised of a fiber optic cable, and the connector is comprised of a fiber optic connector.

3. The connector assembly of claim 1, further comprising a strain relief connected between the cable end and the connector to provide strain relief for the at least one antenna wire.

4. The connector assembly of claim 1, wherein the at least one antenna wire is loosely contained inside the at least one furcation tube to accommodate movement of the cable.

5. The connector assembly of claim 1, wherein an inner diameter of the at least one furcation tube is at least −0.1 millimeters (mm) larger than an outer diameter of the at least one antenna wire.

6. The connector assembly of claim 1, wherein the at least one antenna wire has an exposed section with a length in a range between 7.0 centimeters (cm) and 11.0 cm.

7. The connector assembly of claim 1, wherein at least seventy-five percent (75%) of the length of the at least one antenna wire is disposed inside the at least one furcation tube.

8. The connector assembly of claim 1, wherein the at least one furcation tube resides adjacent to the at least one communication line in the interior area.

9. The connector assembly of claim 1, wherein the at least one RFID tag is included in the connector and is electrically connected to the at least one antenna wire.

10. The connector assembly of claim 9, wherein the at least one RFID tag is comprised of a passive RFID tag.

11. The connector assembly of claim 1, wherein the at least one communication line is comprised of at least one bend-insensitive optical fiber.

12. The connector assembly of claim 1, wherein the at least one antenna wire includes a first wire and the at least one RFID tag includes a first RFID tag, the connector assembly further comprising:
an adapter configured to operably engage with the connector and that includes the first RFID tag and a first electrical contact electrically connected to the first RFID tag; and
a connector electrical contact supported by the connector and electrically connected to the first wire and configured to electrically contact the first electrical contact when the connector and the adapter operably engage so that the first wire serves as at least a portion of the RFID antenna for the first RFID tag.

13. The connector assembly of claim 12, wherein the at least one antenna wire further includes a second wire and the at least one RFID tag includes a second RFID tag, and wherein:
the connector supports the second RFID tag; and
the second wire is electrically connected to the second RFID tag and serves as the portion of the RFID antenna for the second RFID tag.

14. The connector assembly of claim 1, further comprising an adapter configured to operably engage with the connector, and that includes the at least one RFID tag.

15. A telecommunications assembly, comprising:
a plurality of connector assemblies each comprising:
a cable comprising a cable end, an interior area, at least one communication line, and at least one furcation tube disposed in the interior area;
a connector operably connected to the cable end; and
at least one antenna wire configured to be electrically connected to at least one radio-frequency identification (RFID) tag to serve as at least a portion of an RFID antenna for the at least one RFID tag;
wherein at least a portion of the at least one antenna wire is disposed inside the at least one furcation tube;
a plurality of adapters having respective RFID tags and that are operably engaged with the plurality of connector assemblies so that the RFID tags are respectively electrically connected to the respective RFID tags of the corresponding connector assemblies; and
at least one RFID reader arranged in relation to the antenna wires so as to operably communicate with the plurality of RFID tags.

16. The telecommunications assembly of claim 15, wherein one or more of the plurality of RFID tags each have respective antennas, and wherein the respective antenna wires of the one or more of the plurality of the RFID tags are electrically connected to the respective antennas.

17. The telecommunications assembly of claim 15, wherein the respective antenna wires of the one or more RFID tags serve as substantially an entire antenna for the corresponding one or more RFID tags.

18. The telecommunications assembly of claim 15, wherein the cable in the plurality of connector assemblies is comprised of a fiber optic cable, and the connector in the plurality of connector assemblies is comprised of a fiber optic connector.

19. A method of providing a connector assembly, comprising:
providing a connectorized cable comprising a cable comprising a cable end, an interior area, at least one communication line, at least one furcation tube disposed in the interior area, and a connector operably connected to the cable end;
disposing at least a portion of at least one antenna wire run from the at least one radio-frequency identification (RFID) tag inside the at least one furcation tube; and
electrically connecting the at least one antenna wire to an integrated circuit (IC) chip of the at least one RFID tag so as to serve as at least a portion of an RFID antenna for the at least one RFID tag.

20. The method of claim 19, further comprising supporting the at least one RFID tag by the connector.

21. The method of claim 20, further comprising the at least one RFID tag harvesting power exclusively from radio-frequency (RF) signals received over the RFID antenna.

22. The method of claim 19, further comprising:
supporting the at least one RFID tag by an adapter configured to operably engage with the connector; and
operably engaging the connector and the adapter so as to cause the at least one antenna wire to be electrically connected to the IC chip.

23. The method of claim 19, where electrically connecting the at least one antenna wire to the IC chip further comprises electrically connecting the at least one antenna wire to the portion of the RFID antenna electrically connected to the IC chip of the at least one RFID tag.

24. The method of claim 19, wherein disposing the at least a portion of the at least one antenna wire comprises disposing at least seventy-five percent (75%) of the length of the at least one antenna wire inside the at least one furcation tube.

25. The method of claim 19, wherein the at least one communication line is comprised of at least one bend-insensitive optical fiber.

* * * * *